US008793194B2

(12) United States Patent
Lee

(10) Patent No.: US 8,793,194 B2
(45) Date of Patent: Jul. 29, 2014

(54) DIRECT DISTRIBUTION SYSTEM FOR CONSUMER GOODS AND SERVICES

(76) Inventor: Hohyung Lee, Duluth, GA (US)

( * ) Notice: Subject to any disclaimer, the term of this patent is extended or adjusted under 35 U.S.C. 154(b) by 1555 days.

(21) Appl. No.: 10/997,693

(22) Filed: Nov. 24, 2004

(65) Prior Publication Data

US 2005/0137935 A1    Jun. 23, 2005

Related U.S. Application Data

(63) Continuation-in-part of application No. 10/499,245, filed as application No. PCT/US03/05941 on Feb. 27, 2003.

(60) Provisional application No. 60/360,356, filed on Feb. 28, 2002, provisional application No. 60/525,468, filed on Nov. 26, 2003.

(51) Int. Cl.
  *G06Q 30/00* (2012.01)
  *G06Q 10/08* (2012.01)

(52) U.S. Cl.
  CPC .......... *G06Q 10/083* (2013.01); *G06Q 10/0835* (2013.01); *G06Q 10/08355* (2013.01)
  USPC ............................ 705/330; 705/336; 705/338

(58) Field of Classification Search
  USPC ......... 705/26, 1, 7, 10, 11, 14, 27, 30, 34, 37, 705/39, 40, 50–53, 80; 235/375, 379
  See application file for complete search history.

(56) References Cited

U.S. PATENT DOCUMENTS 6,246,998 B1    6/2001  Matsumori
(Continued)

FOREIGN PATENT DOCUMENTS

WO      WO 90/11572 A1 * 10/1990 .............. G06F 15/24
WO      WO00/64089        10/2000
(Continued)

OTHER PUBLICATIONS

Best Buy [online]. 2001, [retrieved on Nov. 14, 2008]. Retrieved from the internet: <URL: http://web.archive.org/web/20010806025353/www.bestbuy.com/infoCenter/Delivery/index.asp> (pp. 1-7) and <URL: http://web.archive.org/web/20010612180057/www.bestbuy.com/infoCenter/Services/Repairs/MobileElectronics.asp> (pp. 8-9).

(Continued)

*Primary Examiner* — Ryan Zeender
*Assistant Examiner* — H Rojas
(74) *Attorney, Agent, or Firm* — David L. Hoffman; Hoffman Patent

(57)    ABSTRACT

A system and method for enabling direct transactions between a customer and a provider of goods and/or services. A plurality of suppliers or service providers provide data regarding offerings and services, and a database of selected information is collected and integrated for review and comparison by potential customers. An efficient distribution system delivers products and services to local service and pick-up centers where the customer retrieves them, or delivers the products and services directly to the customer, depending on customer preference. The cost of delivery is dependent on the customer preference and is based on proximity of delivery to customer.

7 Claims, 31 Drawing Sheets

(56) References Cited

U.S. PATENT DOCUMENTS

| | | | |
|---|---|---|---|
| 7,177,825 B1* | 2/2007 | Borders et al. | 705/26 |
| 7,257,552 B1* | 8/2007 | Franco | 705/28 |
| 7,272,571 B2* | 9/2007 | Tuttrup et al. | 705/22 |
| 2001/0051901 A1 | 12/2001 | Hager et al. | |
| 2002/0016726 A1* | 2/2002 | Ross | 705/7 |
| 2002/0111873 A1 | 8/2002 | Ehrlich et al. | |
| 2002/0156685 A1 | 10/2002 | Ehrlich et al. | |
| 2003/0074267 A1 | 4/2003 | Acharya | |
| 2003/0208401 A1* | 11/2003 | Karsten | 705/14 |
| 2005/0080635 A1 | 4/2005 | Lee | |

FOREIGN PATENT DOCUMENTS

| | | | | |
|---|---|---|---|---|
| WO | WO 01/01300 A1 | 1/2001 | | |
| WO | WO01/71601 A1 * | 9/2001 | | G06F 17/60 |
| WO | WO 01/80147 A2 | 10/2001 | | |
| WO | WO 01/97101 A2 | 12/2001 | | |

OTHER PUBLICATIONS

UPS Pressrom, 2001 Press Releases [online]. 2004, [retrieved on Nov. 14, 2008]. Retrieved from the Internet: <http://web.archive.org/web/20040419103335/pressroom.ups.com/pressreleases/archives/archive/0,1363,3839,00.html> (2 pgs).

* cited by examiner

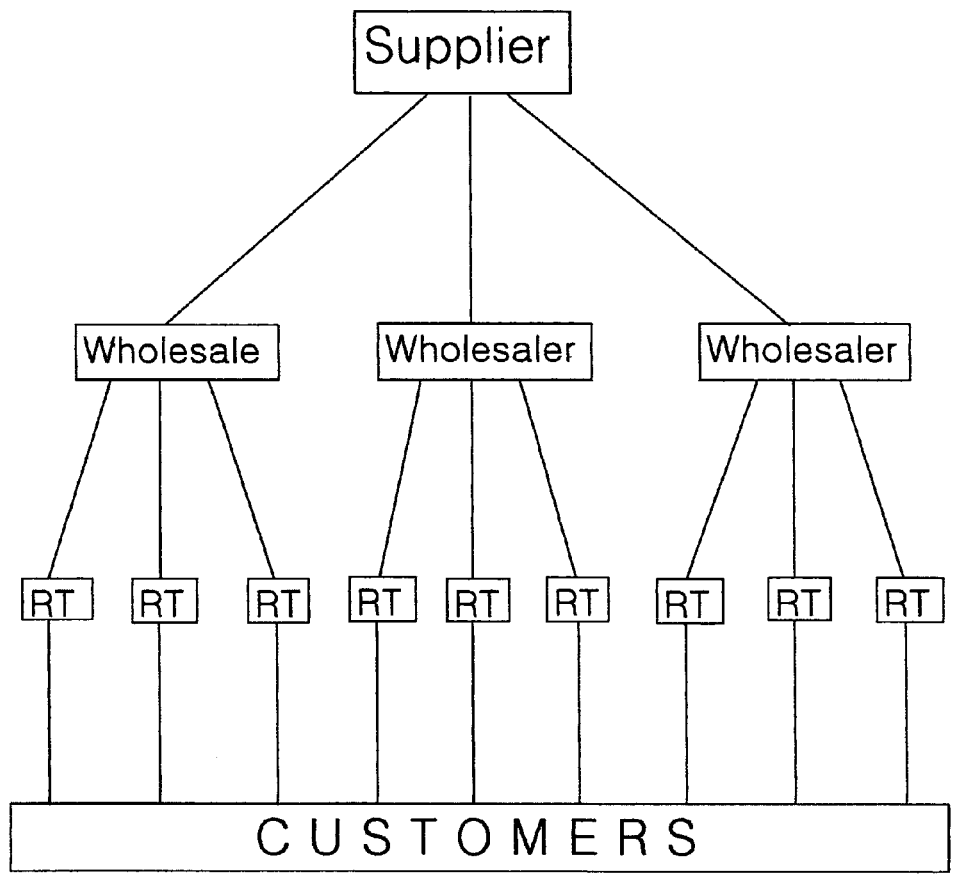
*** RT : Retailer
Fig. 1-A

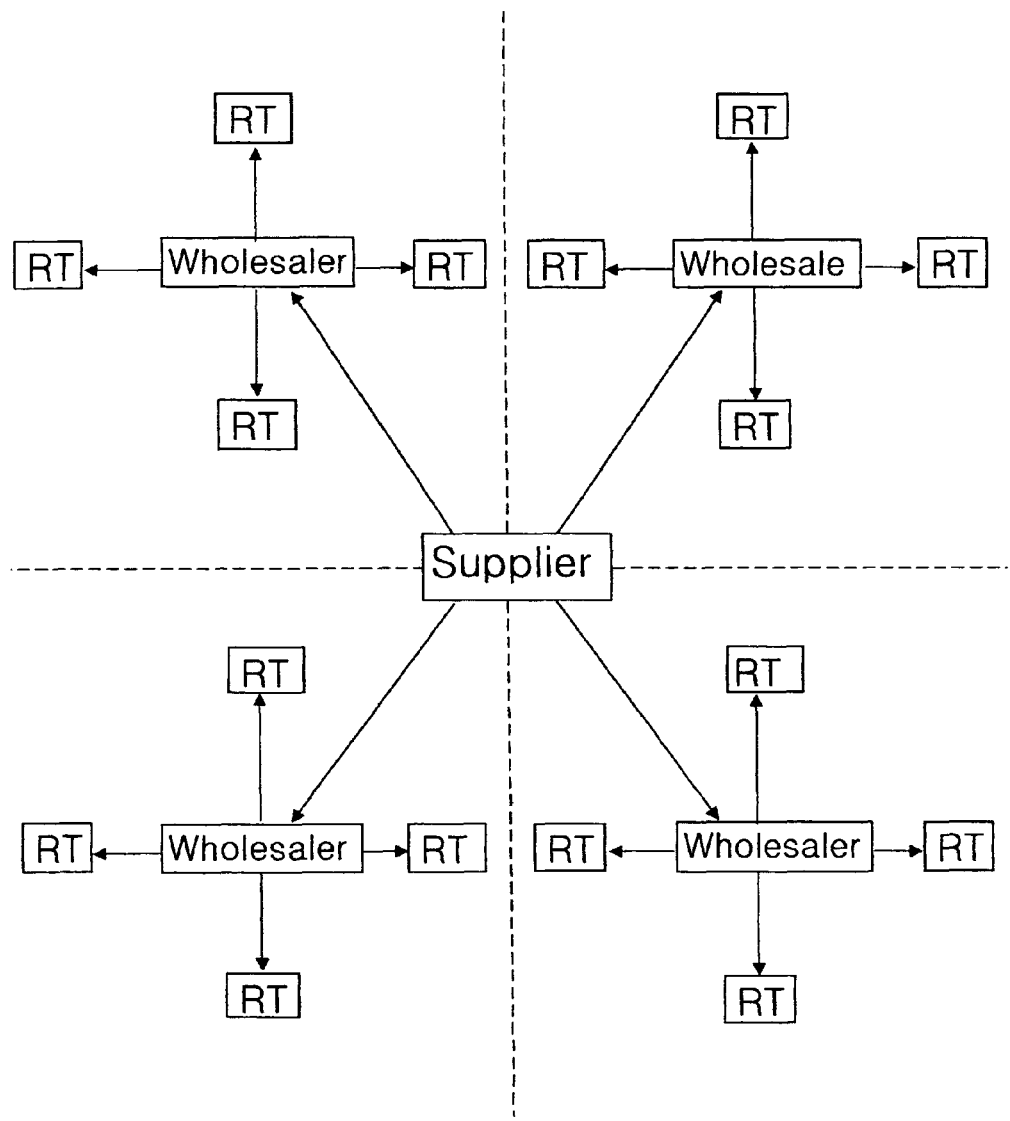
*** RT : Retailer
Fig. 1-B

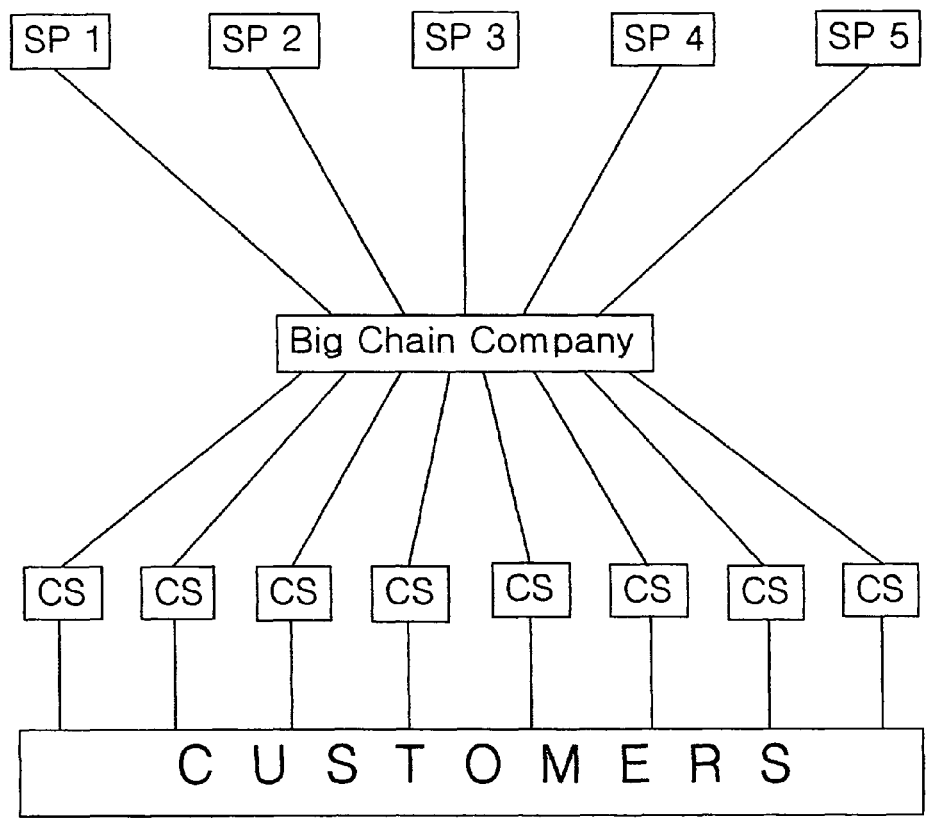
*** SP : Supplier
*** CS : Chain Store
Fig. 2-A

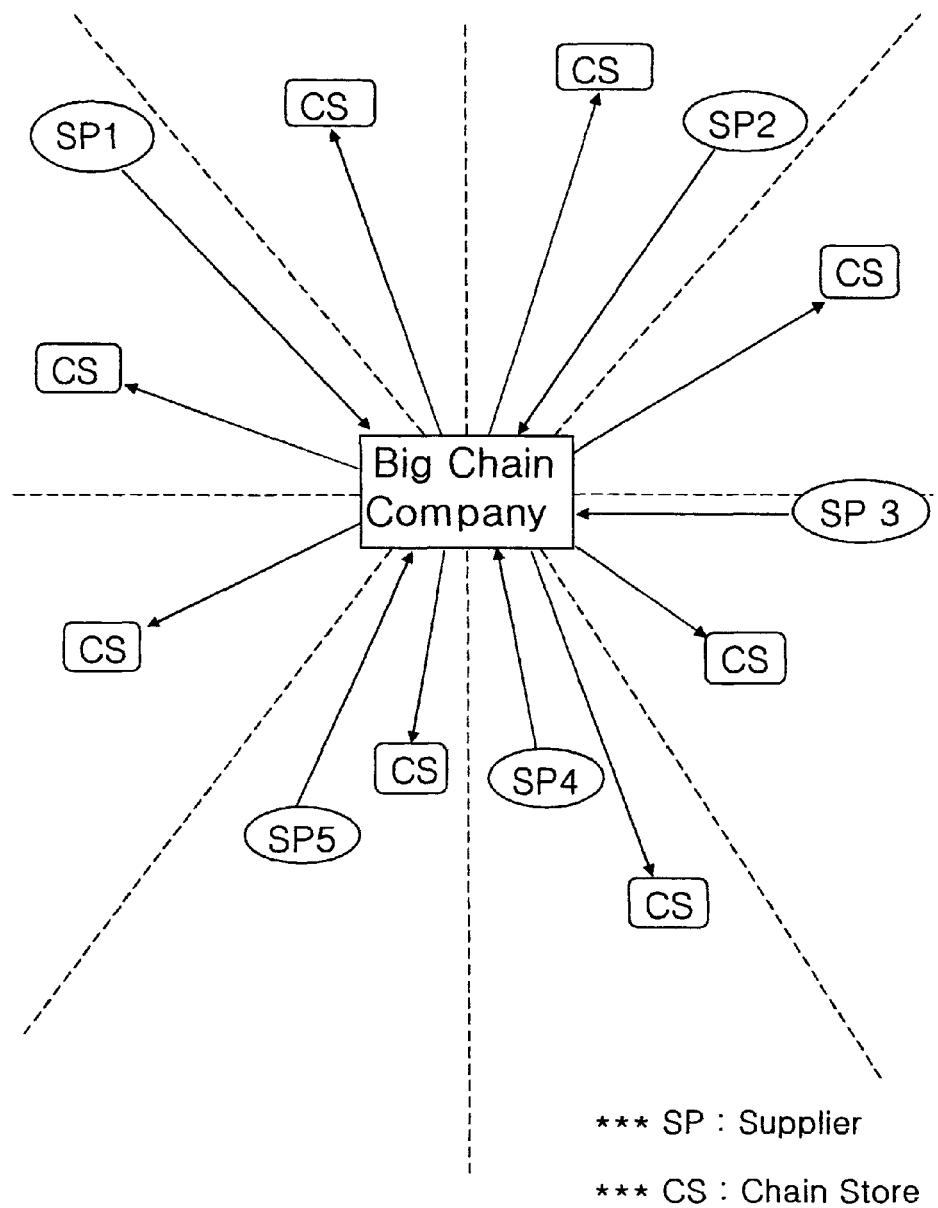
*** SP : Supplier
*** CS : Chain Store
Fig. 2-B

*** CU : Customer

* B : Business

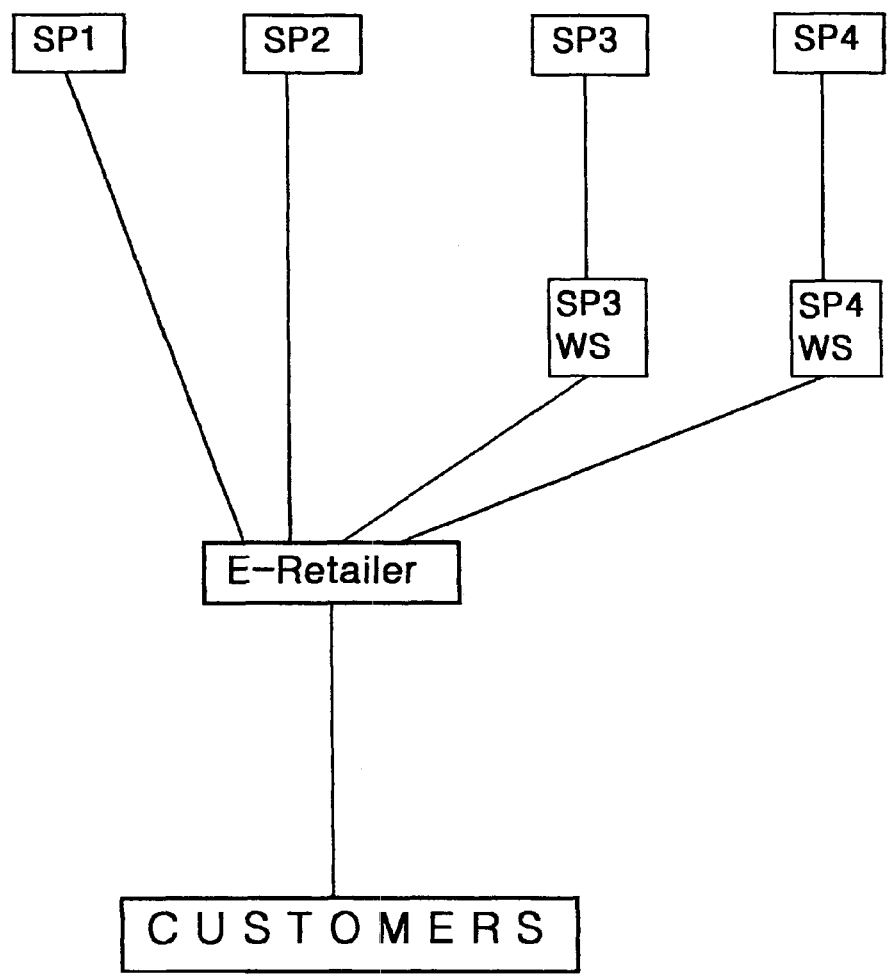
* SP : Supplier
* WS : Wholesaler
Fig. 6-A

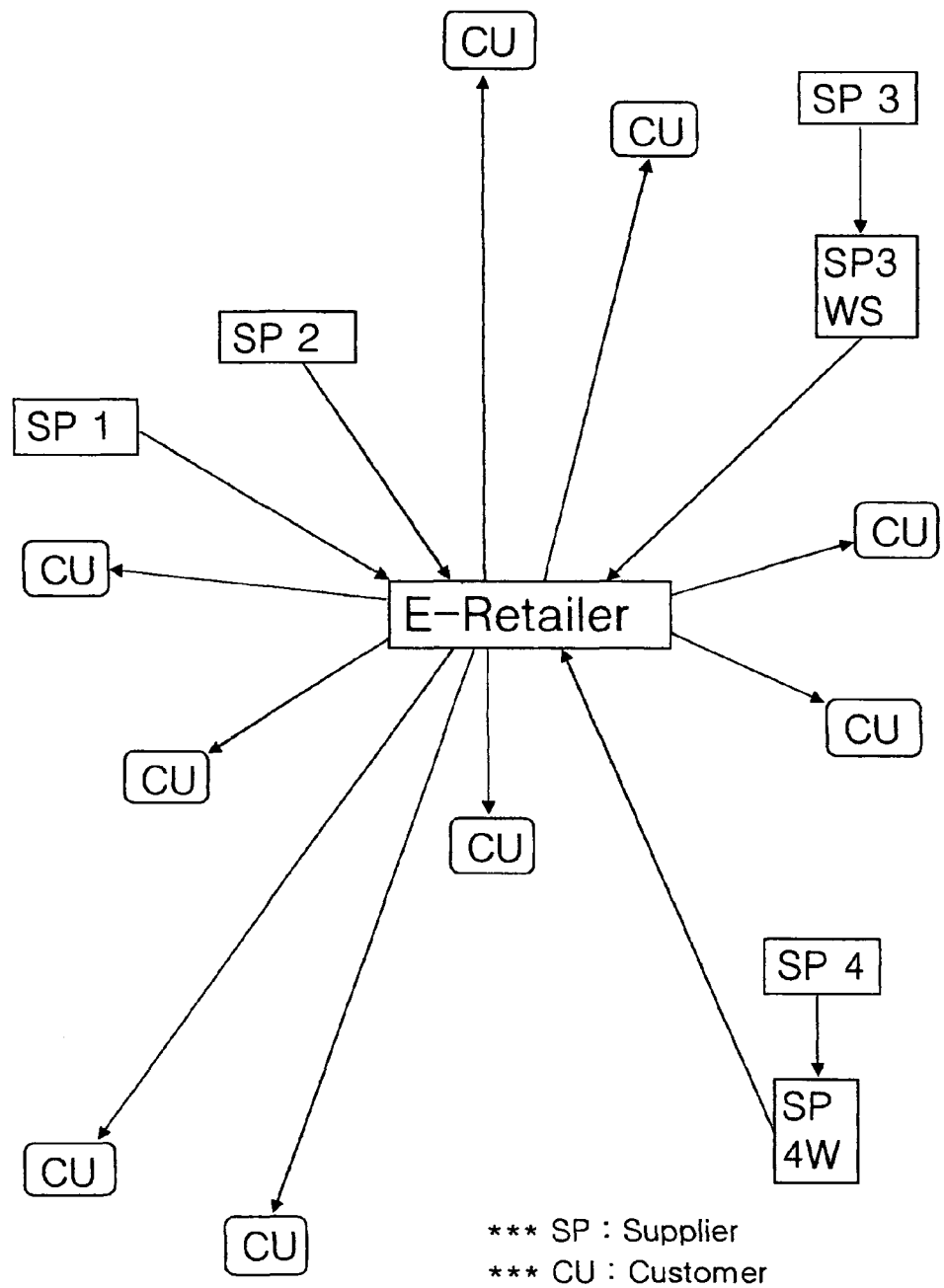
Fig. 6-B

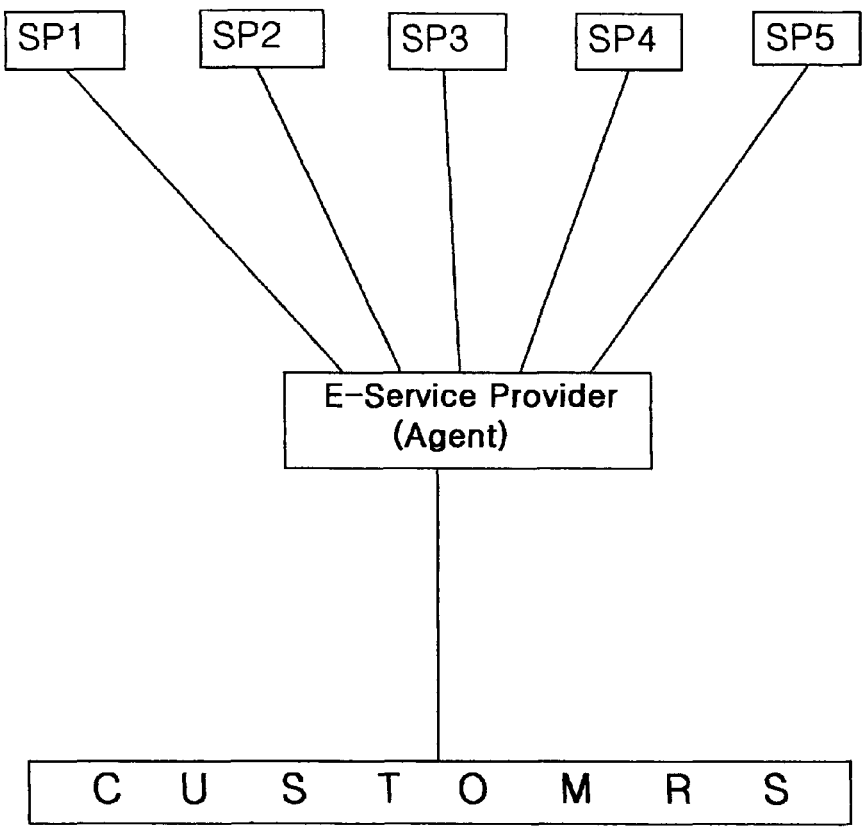
\* SP: Service Provider
Fig. 7-A

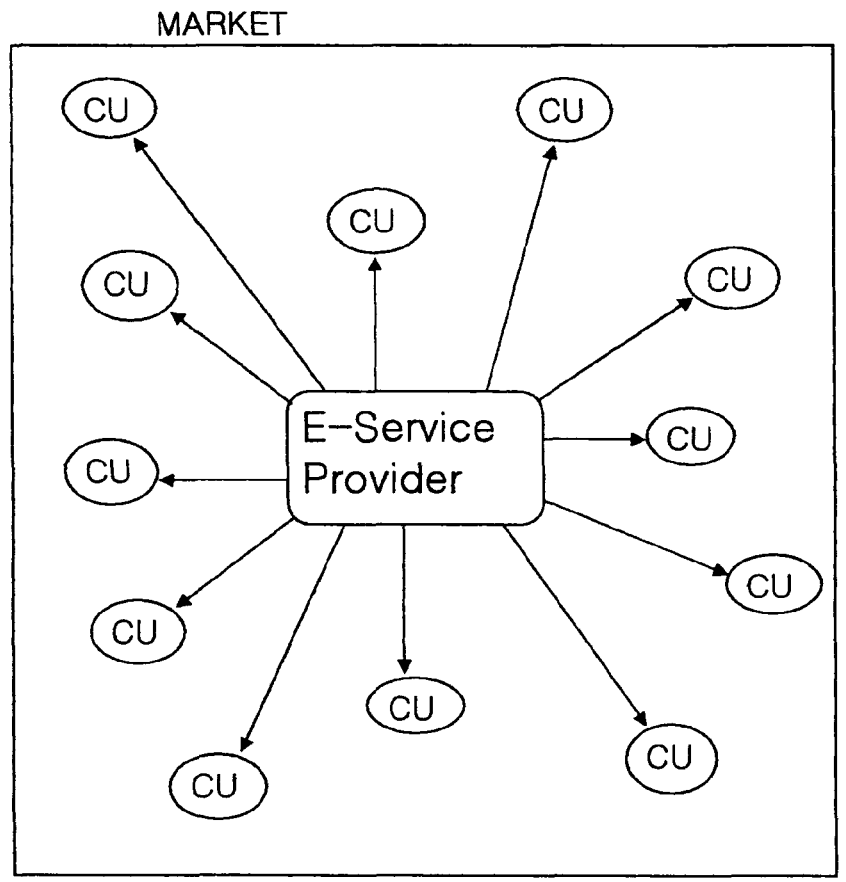
*** CU : Customer
———— : Delivery
Fig. 7-B

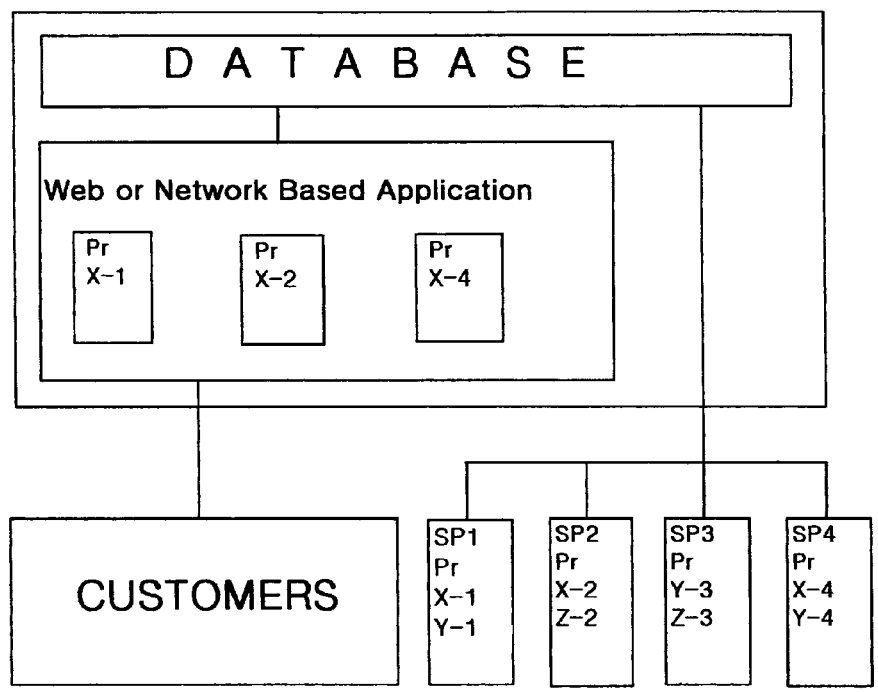
*** SP : Supplier or Service Provider
*** Pr : Product
Fig. 8-A

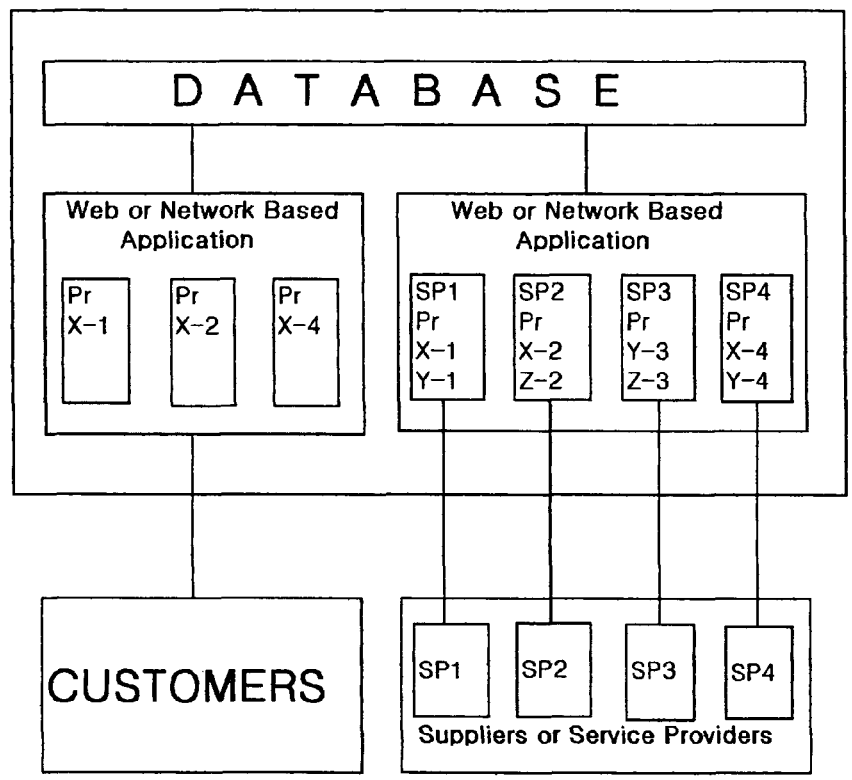
*** SP : Supplier or Service Provider
*** Pr : Product
Fig. 8-B

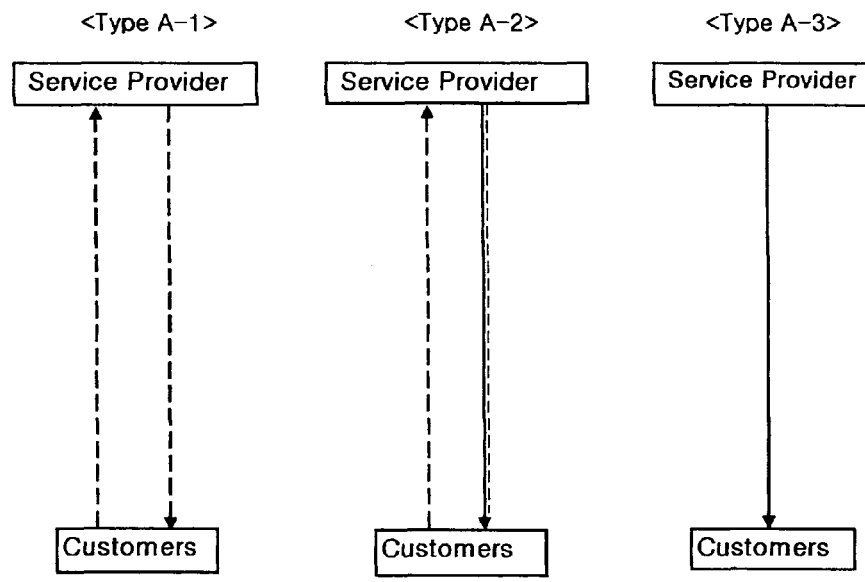
Fig. 11-A

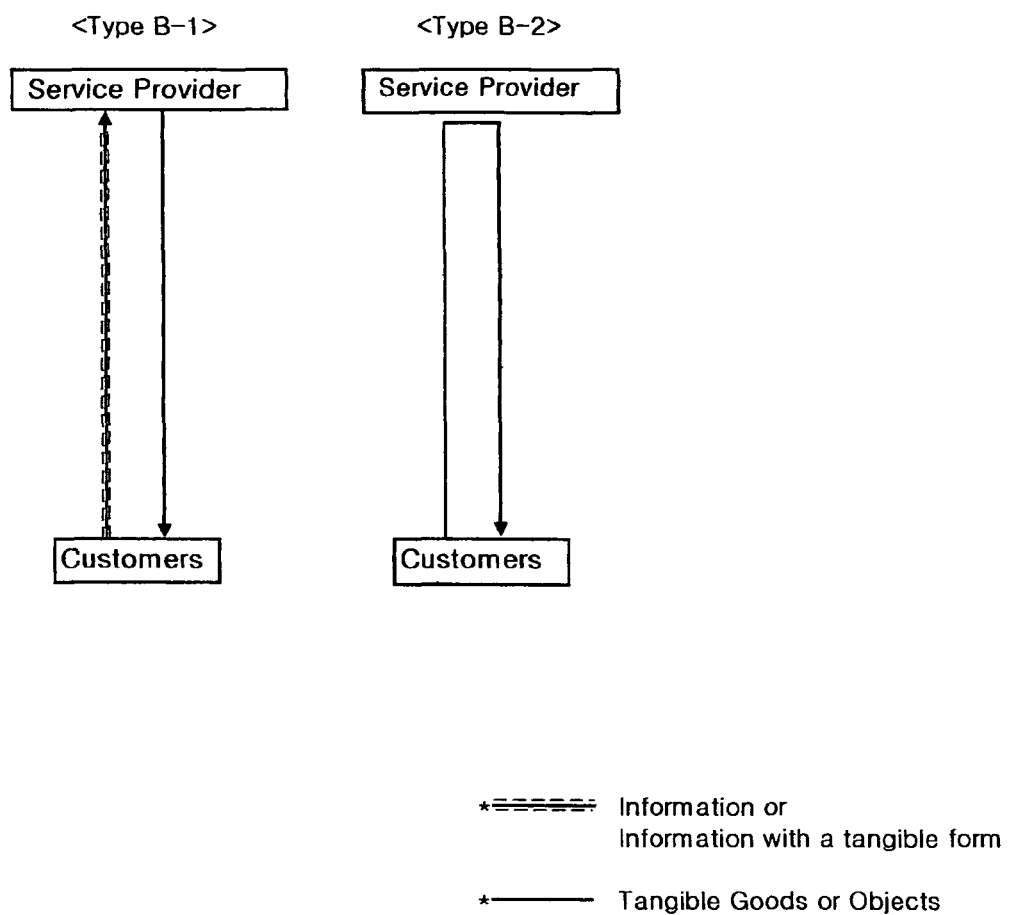
Fig. 11-B

←---- : Information

←———— : Information with a tangible form

BSA : Business Service Area
O  : Distribution and
     Transportation Center
* : Supplier ★ : Supplier BSA : Business Service Area
DTC : Distribution and Transportation Center
WSC : Warehouse and Service Center

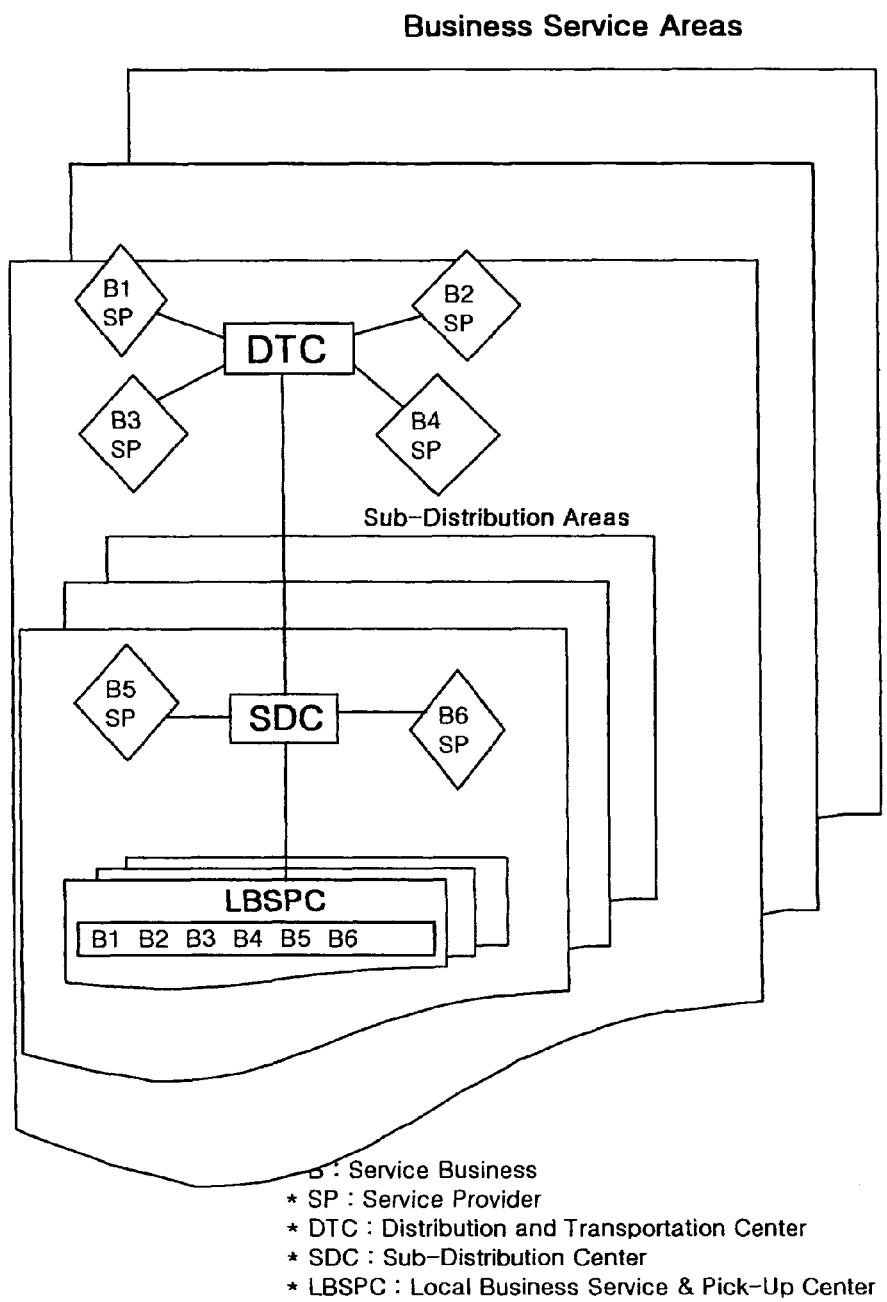
Fig. 23-A

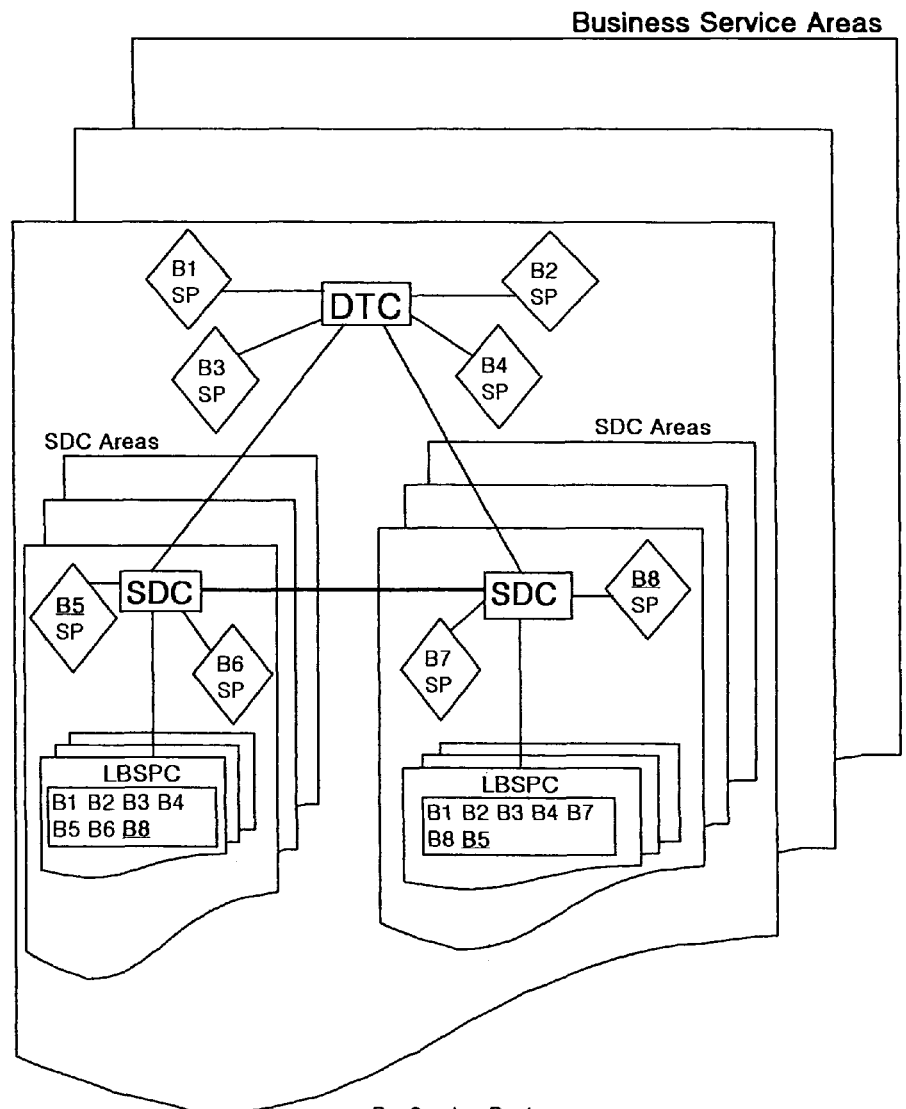
* B : Service Business
* SP : Service Provider
* DTC : Distribution and Transportation Center
* SDC : Sub-Distribution Center
* LBSPC : Local Business Service & Pick-Up Center
Fig. 23-B

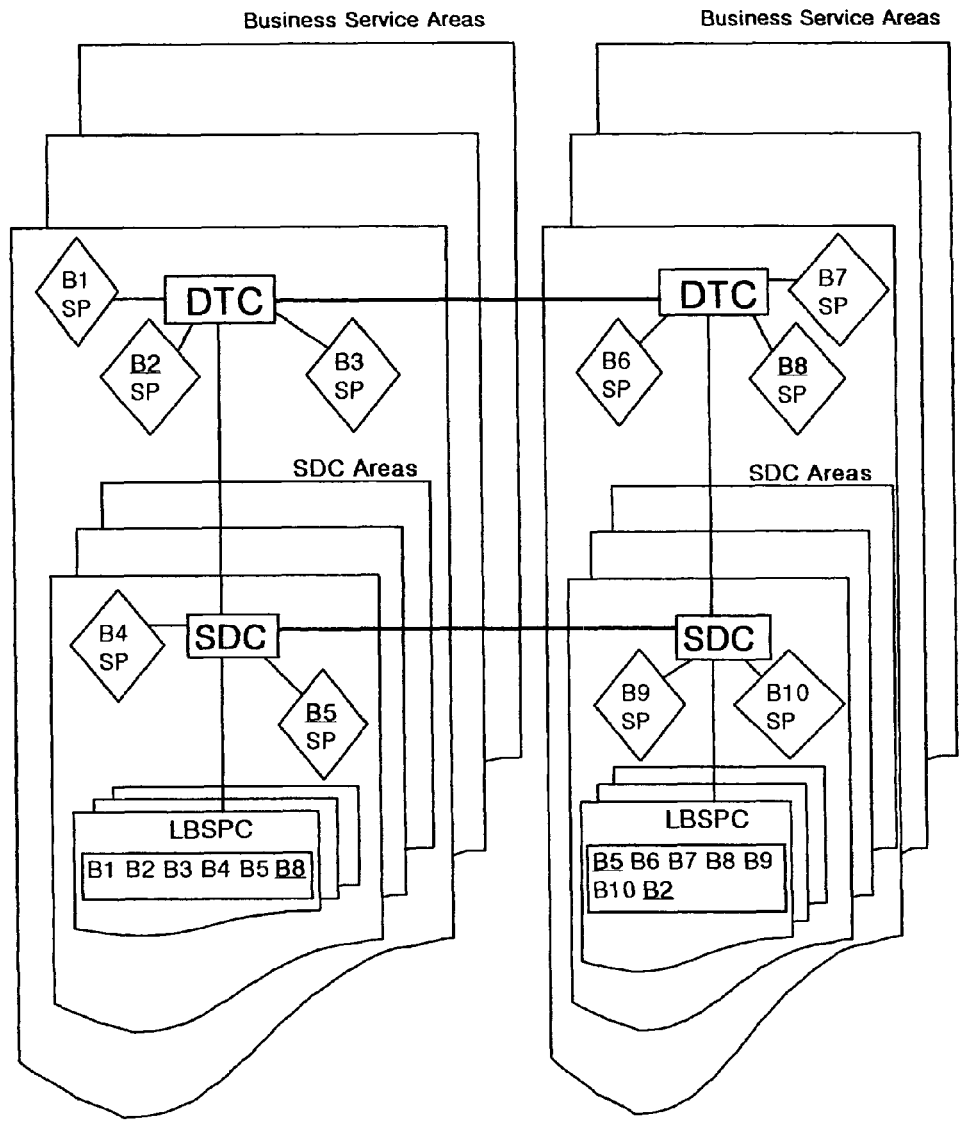
* B : Service Business
* SP : Service Provider
* DTC : Distribution and Transportation Center
* SDC : Sub-Distribution Center
* LBSPC : Local Business Service & Pick-Up Center
Fig. 23-C

DIRECT DISTRIBUTION SYSTEM FOR CONSUMER GOODS AND SERVICES

CROSS-REFERENCE TO RELATED APPLICATIONS

This application is a continuation-in-part of U.S. patent application Ser. No. 10/499,245 filed Jun. 17, 2004, which is the national phase of International Application No. PCT/US03/05941, designating the U.S. and filed on Feb. 27, 2003, which claims the benefit of U.S. Provisional Patent Application Ser. No. 60/360,356, filed Feb. 28, 2002. This application also claims the benefit of U.S. Provisional Patent Application Ser. No. 60/525,468 filed Nov. 26, 2003. All of these applications are incorporated herein by reference in their entireties for all purposes.

FIELD OF THE INVENTION

The present invention relates generally to the field of distribution systems and methods; and more particularly to a direct distribution system for transaction completion and delivery of goods and/or services, using information technology to improve customer convenience and satisfaction and increase market productivity and efficiency.

BACKGROUND OF THE INVENTION

The rapid development of information technology and systems has brought significant change to competitive markets as a whole and has also increased consumer demand for convenience. However, in some instances, ineffective or inappropriate use of information technology and systems has resulted in unnecessary inefficiency and inconvenience in the distribution and delivery of goods and services.

FIG. 1-A and FIG. 1-B are distribution chain diagrams of traditional market & delivery systems for consumer goods, which have been developed over time and which have existed, in general, without significant improvement in efficiency. Suppliers typically distribute goods to local or regional wholesalers, and the wholesalers, in turn, sell the goods to local or regional retailers for a 15-25% price mark-up. Retailers then commonly apply an additional 30-40% mark-up prior to selling these goods to the customers who buy from their stores. The most notable drawback to such systems is the significant mark-up of price for the end consumer. While the supplier's price is often fair for customers, the net purchase price for the customer includes a profit margin for both the wholesaler and the retailer.

Since price differentiation is generally a significant demand driver for consumer goods, suppliers could benefit from the availability of alternative distribution systems to increase demand for their products by providing end-customers with lower net purchase prices, without sacrificing their own profit margins in the long run. Reduction of distribution and delivery cost is often the most important area of potential improvement for suppliers to reduce unit product delivery costs and, ultimately, the price for consumers. Some examples of problems currently facing suppliers and wholesalers include the need for both suppliers (to wholesalers) and wholesalers (to retailers) to mandate minimum purchase amounts and volumes, the need for suppliers to create and operate their own sub-wholesale distribution system due to geographical constraints, and slow response to changing customer demands. These problems will be exacerbated as product diversity and competition continues to increase.

Another problem facing suppliers is the lack of access to direct information about their end-customers. Retailers often have direct contact with end-customers, but they generally do not have the scale to influence demand and price based on this information. However, wholesalers potentially do have the scale to influence demand and price within their area or region. If wholesalers were provided with direct information from end-customers, wholesalers potentially could manipulate both suppliers and retailers for their own profit enlargement. Also, access to direct information from end-customers could provide suppliers with significant insights for product development and service improvement opportunities.

In addition, under current systems, the opportunity to obtain both one-stop shopping and the best purchase price is very difficult for end customers. However, current systems typically do provide the customer with the opportunity to see and touch their potential purchases and to do comparison shopping for the best price available.

Inventory control is also an important issue for suppliers, wholesalers and retailers. Under current systems, wholesalers and retailers typically are responsible for inventory control and must control inventories from multiple suppliers or wholesalers, respectively. The need to control inventory is constrained by current delivery methods employed by suppliers to wholesalers, and wholesalers to retailers. If a direct distribution system were used in the marketplace (suppliers directly to consumers), then the need for wholesaler and retailer inventory control (and the associated costs) could be eliminated or substantially reduced. The supplier could be exclusively responsible for inventory control and have direct and real time access to customer demand. The supplier could also manage inventory equally or more efficiently than wholesalers and retailers, since they would not have to manage multiple supply sources and products, or the delivery hand-offs included in the current system.

FIG. 2-A and FIG. 2-B show that by equipping a retail chain system, wholesalers can (a) increase their buying power to receive better deals from suppliers; and (b) offer a better price to consumers though a direct channel. However, since the purpose of this system typically is to maximize the profit of the big chain companies operating as wholesalers, and the number of locations for a big chain store will be limited, such systems may be limited in their ability to maximize customer satisfaction. Also, since this type of distribution system is inherently a low margin, high operating expense operation, the success of this type of system typically is very sensitive to market conditions. And this type of system generally will not be focused on improving customer convenience and satisfaction, since the customers are still isolated from suppliers and the chain companies will need to provide a high degree of focus on operational issues such as inventory control, delivery cost, and warehousing costs.

Other types of business models are utilized by service provider businesses. Service provider businesses typically require direct contact with customers and the delivery of personalized services to each customer. To meet these basic conditions for their business, service providers typically operate their business service centers in an area where their customers are easily accessible (FIG. 3), or through establishment of franchises (FIG. 5) or authorized local agents (FIG. 4) in multiple geographic areas. These types of businesses typically have high operating expenses and can also face limitations in their geographical coverage. Service businesses, such as dry cleaning, repair (i.e. computers, electronic devices, and cameras) and pharmacies also need to identify a convenient location for customer drop off and pick-up. These locations need to balance the convenience for customers with the operating cost or overhead for the location. Commonly encountered difficulties facing these types of business include:

Limited number of drop off and pick-up locations limit the potential customer coverage area.

Operating expenses are generally higher in "high traffic" areas that are easily accessible to customers.

Additional operating expenses are incurred for franchises and locally authorized agents, such as franchise fees, royalty payments, and agent commissions.

Inability to purchase supplies (i.e. parts, raw materials) in volume to obtain a lower unit cost.

Difficulty in obtaining and purchasing advanced or specialty equipment, or resources with specialized skills.

Difficulty in maintaining quality due to price sensitivity.

Difficulty for customers to compare services and pricing among different providers.

Since this type of business model is often risky, the current marketplace has seen an increase in use of sub-contracted work for service type business or the utilization of a service department as part of a bigger business. These types of service provider businesses present their own problems, such as:

Price for services is higher since it reflects additional overhead (cost to sub-contract or expenses for larger business).

Difficulty to maintain the level of quality due to sub-contracting or management as part of a larger business.

Customers continue to demand many kinds of service businesses in their local geographic areas, but the basic problems facing these types of business described above facilitate the trend towards franchises or running a service as part of a larger business.

FIG. 6-A and FIG. 6-B show how through the application of information technology to the traditional market system for consumer goods, an e-commerce based system attempts to improve customer convenience and distribution process efficiency. These improvements often enable the offering of a lower price and enhanced service to customers. However, the e-retailer's role, in effect, becomes a wholesaler or sub-wholesaler in this system. E-retailers typically do not offer delivery options other than direct delivery to the end customer. And because the e-retailer typically uses an expensive carrier for delivery, the cost benefits of this type of system to the end customer often are diluted and not fully realized. E-commerce systems could result in price decreases in some aspects by reducing the roles of retail stores in the traditional market system or big chain company system. However, because end customers often are geographically scattered, their delivery time and cost will be different. Also, with the increased handling of products, such a system can create problems with inventory control and sales estimation. For some products, some customers can be satisfied by this system's utilization. But the basic problem remains how to reduce delivery cost from e-retailers to the end customer. Also, these businesses are limited since they only leverage the Internet as a customer contact channel and only utilize payment methods that are secure for electronic commerce. A significant portion of potential customers either do not have credit cards, do not trust on-line payment systems, or would simply prefer to pay cash for goods or services. As a result, these customers generally do not do business with e-retailers.

In the service provider market, new e-commerce technology has increased the customer's convenience and satisfaction in many cases. However, as shown in FIG. 7-A, e-service providers generally are still acting as agents for service providers, wherein their prices will include commissions. Also, typical e-service providers handle only a limited number of products, and are not able to provide the customer with a way to compare their costs and service offerings with those of competitors. As shown in FIG. 7-B, for situations where the service provided is delivery of a tangible product, e.g. paper ticket delivery, these types of business are subject to the same limitations of e-commerce (use of internet, payment methods, etc.).

Thus, it can be seen that needs exist for improved methods and systems for utilizing information technology, and systems to maximize customer satisfaction, improve customer convenience and improve market productivity and efficiency. In particular, significant opportunities exist to improve the distribution system for consumer goods and services through implementation of a new and direct distribution system. It is to the provision of improved systems and methods for the distribution and delivery of goods and/or services meeting these and other needs that the present invention is primarily directed.

SUMMARY OF THE INVENTION

The present invention provides improved systems and methods for the distribution and delivery of goods and/or services. In preferred and example embodiments, the system and method of the present invention allow customers to conduct direct transactions with suppliers of goods and service providers (collectively, "providers"). The customer preferably is able to search for and identify a desired product or service selected from one or more available products or services ("offerings") from one or more providers, with increased convenience. The system and method of the present invention preferably provide a new and improved sales channel for suppliers of goods and for service providers, thereby increasing their sales volume. For customers, the system and method of the present invention preferably provide the ability to perform direct price comparison, which will enable increased price competition among suppliers and service providers, thereby facilitating the best available price for customers. The system and method of the present invention provide fast and reduced cost delivery by enabling more efficient transportation, distribution, warehousing and local delivery or pick-up functions. The system and method of the present invention also provides customers the ability to select the geographical location at which to receive or pick up delivered goods or to drop off or deliver goods requiring service or make payment. The system and method of the present invention provide customers with different cost and/or convenience options for delivery, depending on the selected drop off or pick-up location.

In one aspect, the invention is a system for enabling direct transactions between a customer and a provider. The system preferably includes a plurality of provider data entries regarding offerings from a plurality of providers; a network or web-based application and/or database application implemented on one or more computers and/or networks of computers (a "software application") integrating information from the provider data entries, and allowing the customer to complete a transaction directly with one of the plurality of providers; and a distribution system for delivering a selected offering directly from the provider to the customer, the distribution system providing the customer with an option of delivery through a local business service and pick-up center. The web or network based application preferably increases customer convenience by providing one integrated site with many different products and services from a plurality of suppliers and service providers, and facilitates price comparison and product or service selection.

In another aspect, the invention is a system for enabling fast and efficient delivery of consumer goods in a certain defined geographical area (a "business service area"). The system preferably includes a network for tracking orders and order status across at least one business service area; at least one facility for carrying out distribution and/or transportation of goods and/or services (a "distribution and transportation center") shared by a plurality of providers; at least one facility for storing and/or servicing items and/or equipment (a "warehouse and service center") shared by a plurality of providers; and at least one facility for facilitating delivery of goods and/or services within a local area and/or allowing customers to pick up goods or receive services in their locale (a "local delivery or pick-up center") shared by a plurality of providers. The system will allow for individual entities to separately focus on the operation and cost reduction of the transport, distribution, warehousing, local delivery and/or pick-up processes. The focus of these entities will provide for decreased overall costs by servicing multiple suppliers and reduction of delivery time.

In another aspect, the invention is a system for facilitating purchase and delivery of an offering from a supplier to a customer for consumer goods. The system preferably includes a plurality of providers, each provider having at least one provider offering; a network integrating data regarding the provider offerings, allowing a customer to complete a transaction with a selected one of the plurality of providers, tracking a status of the transaction, and presenting the customer with at least one delivery option for completing the transaction.

In another aspect, the invention is a system for facilitating purchase and delivery of an offering from a service provider to a customer. This system includes several different types of service provision mechanisms, including:

only information is exchanged between customer and service provider, regardless of geographic location for customer and service provider The service provider receives information from the customer and provides the customer a tangible object or document The service provider only supplies a tangible object which is a credit for a future service to the customer (e.g. pre-paid calling card)

The system preferably includes a plurality of service provider data entries regarding services available to the customer; a database for maintaining selected data entries collected from a plurality of providers and related delivery units; a network integrating data from the database regarding services and tracking of orders and pertinent information for the customer and at least one of the service providers. The customer preferably selects one of the plurality of service providers, receives confirmation of the service on-line and has the option of paying for the service at one of the at least one local business service and pick-up center(s).

In another aspect, the invention is a system for enabling delivery of a service in a defined area wherein a service provider receives information or a tangible object from a customer and delivers goods or an object back to the customer after performing a service. The system preferably includes a network for tracking orders and order status across at least one delivery unit; a plurality of service providers accessible through a plurality of local service stations; and at least one distribution center shared by the plurality of service providers and the plurality of local service stations for delivery of products between local service stations and service providers.

In another aspect, the invention is a system facilitating purchase and delivery of a service in a certain geographic area where a service provider receives information or a tangible object from a customer and delivers the goods or the object back to the customer after the actual service. The system preferably includes a plurality of service providers within a defined business service area, service provider data regarding service provider offerings, a database application for maintaining selected information collected from the plurality of service providers and all related delivery units, a web or network based application integrating data from the database application regarding service provider offerings for the customer, a web or network based application for tracking of orders and order status across all delivery units, at least one distribution and transportation center shared by a plurality of service providers, and a plurality of local service stations for handling the delivery of products between local business service and pick up centers and service providers, using the most efficient delivery method available and at least one local business service and pick up center. With this system, the customer selects one of the plurality of service providers, and has the option of dropping off the good in need of service, picking up the serviced good and/or paying for the service at one of the at least one local business service and pick-up center(s). This system will enable service providers to increase their business volume and reduce operating costs through use of multiple local service stations and provision of multiple services, and increase customer convenience through provision of multiple options for drop off or pick up of the object requiring service and multiple options for payment.

In another aspect, the invention is a system for facilitating purchase and delivery of an offering from a provider to a customer where the provider receives information or a tangible object from the customer and delivers goods or an object back to the customer after performing a service. The system preferably includes a plurality of service providers, each service provider making available at least one service; a network integrating data from the service providers regarding available services, allowing a customer to order an available service from a selected one of the plurality of service providers, and tracking an order status regarding the selected available service.

In another aspect, the invention is a method of completing a transaction directly between a provider and a customer. The method preferably includes providing the customer with information regarding offerings from a plurality of providers; communicating an acceptance of a selected one of the offerings from the customer to a selected one of the providers; and delivering the selected one of the offerings from the selected one of the providers to the customer through a distribution system providing the customer with an option of delivery through a local business pick-up center in a geographic area selected by the customer.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGURES

FIG. 1A shows one embodiment of a distribution system and method for delivery of goods from a supplier to customers through a wholesaler.

FIG. 1B shows another embodiment of a distribution system and method for delivery of goods from a supplier to customers through a wholesaler.

FIG. 2A shows an embodiment of a distribution system and method for delivery of goods from a plurality of suppliers to customers through a large chain company having multiple branch stores.

FIG. 2B shows another embodiment of a distribution system and method for delivery of goods from a plurality of suppliers to customers through a large chain company having multiple branch stores.

FIG. 6A shows an e-commerce system and method for distributing goods to customers through an e-retail business.

FIG. 6B shows another e-commerce system and method for distributing goods to customers through an e-retail business.

FIG. 7A shows an e-commerce system and method for providing services to customers through an e-service provider.

FIG. 7B shows another e-commerce system and method for providing services to customers through an e-service provider.

FIG. 8A shows a system and method for enabling direct transactions between customers and multiple suppliers and/or service providers through a web or network based application and database application, according to an example embodiment of the present invention.

FIG. 8B shows a system and method for enabling direct transactions between customers and multiple suppliers and/or service providers through a web or network based application and database application, according to another example embodiment of the present invention.

FIG. 11A shows example systems and methods for providing services to customers of a service provider.

FIG. 11B shows additional example systems and methods for providing services to customers of a service provider.

FIG. 23A shows distribution and transportation center, sub-distribution center and local business service and pick-up center elements of an example system and method for delivering goods and providing services to customers, according to an example embodiment of the present invention.

FIG. 23B shows distribution and transportation center, and multiple sub-distribution center and local business service and pick-up center elements of an example system and method for delivering goods and providing services to customers, according to an example embodiment of the present invention.

FIG. 23C shows an example system and method for delivering goods and providing services to customers across multiple business service areas, according to an example embodiment of the present invention.

DETAILED DESCRIPTION

Figure 3:
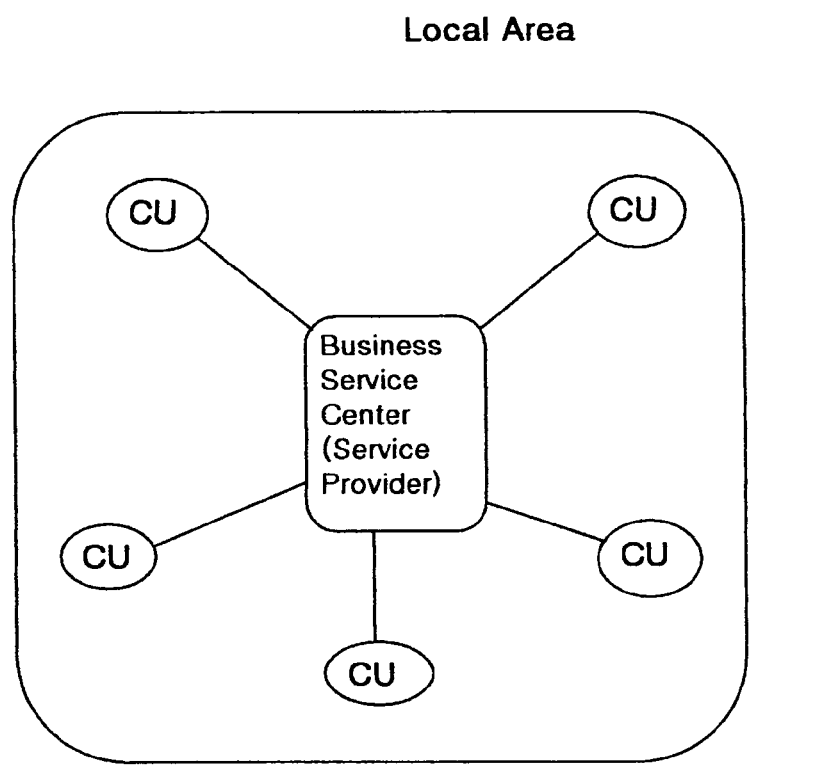
FIG. 3 shows a system and method for providing services to customers within a local area.
Figure 4:
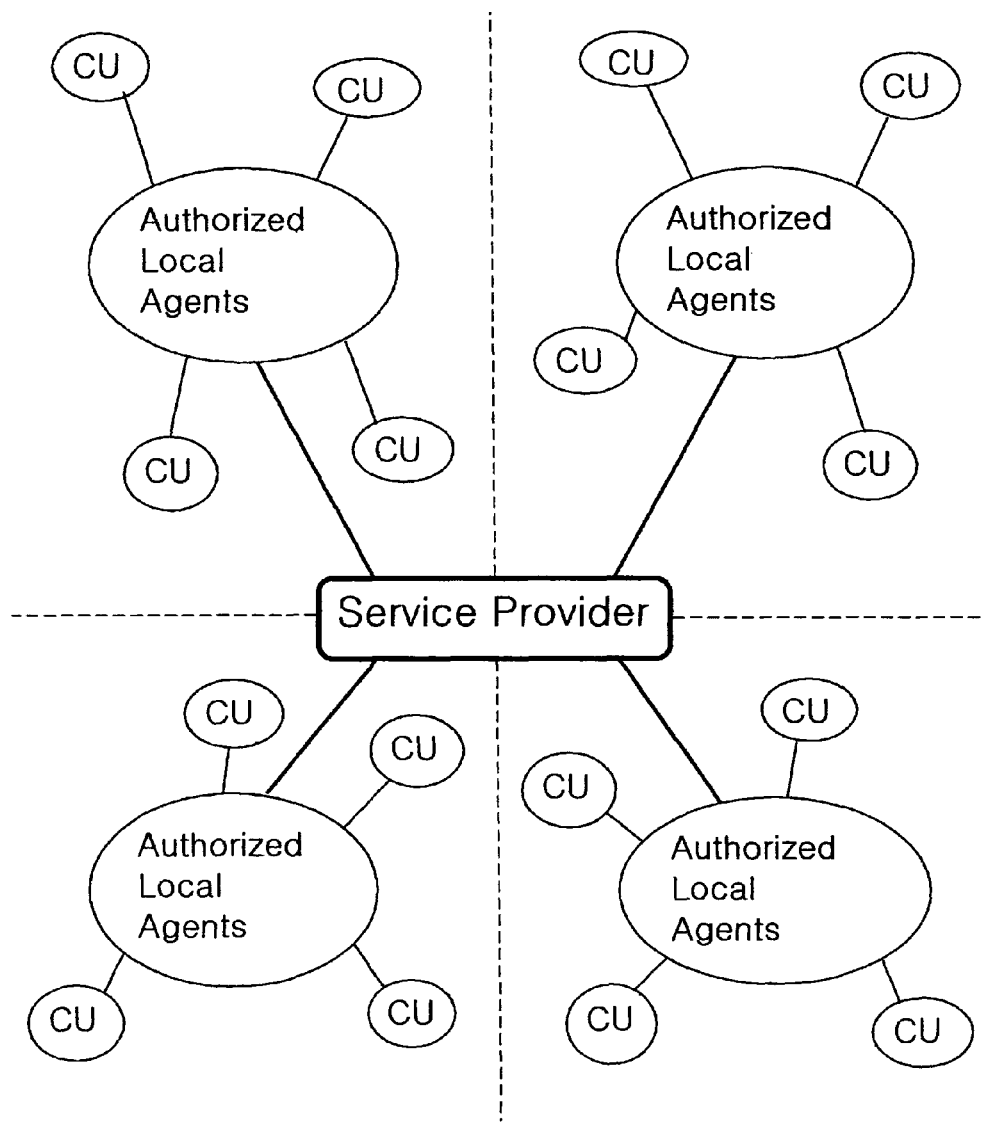
FIG. 4 shows a system and method for providing services to customers through authorized local agents of the service provider.
Figure 5:
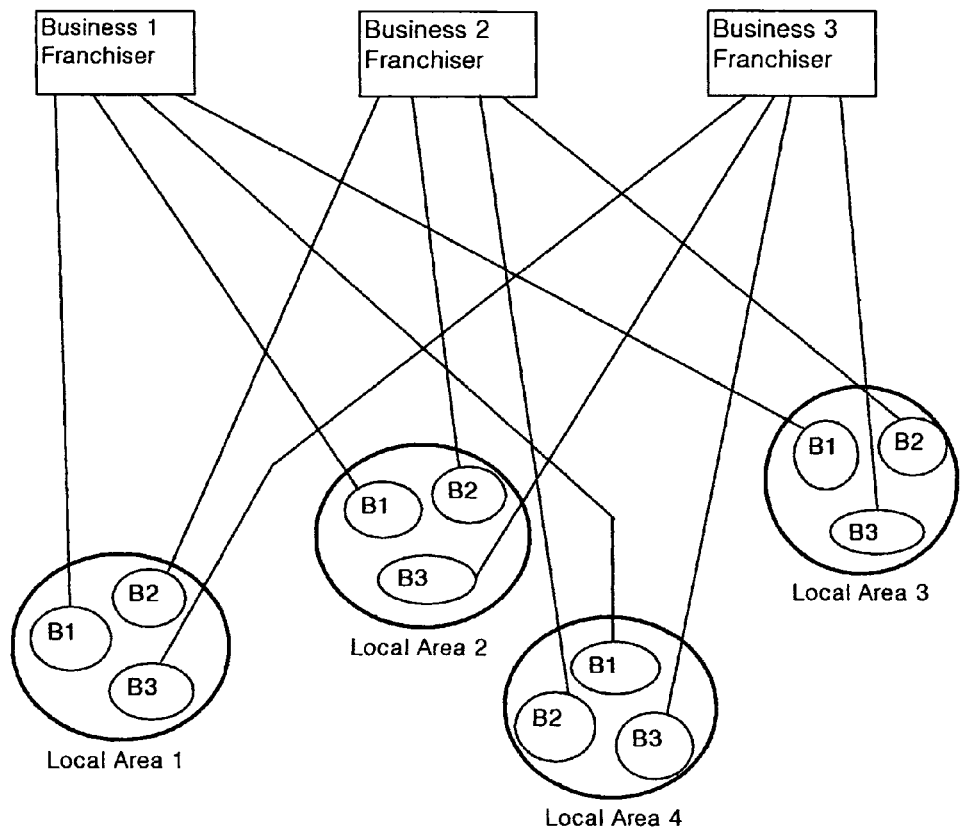
FIG. 5 shows a system and method for providing services to customers through business franchises.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The development of information technology and systems has altered, and in many ways improved, the conditions under which customers and suppliers of goods ("suppliers") and/or providers of services ("service providers") (suppliers and service providers are sometimes referred to collectively herein as "providers") can meet directly together and complete one or more transactions. Often however, when a customer wants to buy a specific product through the Internet, the process to perform a price comparison may be very difficult and time consuming. Not only does the customer have to find the correct web site(s) for the necessary product information, but also must typically sort through other incidental information on the site included for promotional purposes. Customers typically would prefer to receive just the most simple and basic information about a product/service ("offering") and its pricing information, and for more convenience, want it gathered in a manner that facilitates ease of comparison. Therefore, according to example embodiments of the present invention, and as shown in FIG. 8A, a software or other computer-implemented application, preferably comprising a web or network based application and/or a database application will store and integrate data from multiple suppliers and/or service providers and provide the information in a standardized format to the customer for increased convenience. The web or network based application will preferably combine the basic information provided by each supplier and/or service provider in an integrated format to assist the customer's comparison, analysis of products and purchasing decision. The system and method of the present invention are preferably implemented using one or more computers, and preferably a plurality of computers linked by a communications network such as the Internet. For example, a database including one or more data entries regarding providers, available goods and/or services, and/or delivery and/or pick-up options, is preferably stored in a memory device for access and utilization by software executed by the computer(s).

The web or network based application of example embodiments of the present invention advantageously increases customer convenience by providing one integrated view for the customer with many different products and services from many suppliers and service providers, and facilitates price comparison and product or service selection. Suppliers and service providers preferably list their product or service information and pricing in a central database. When the customer performs a search for a specific product or service, the web or network based application preferably retrieves and displays all of the possible products and services stored in the database matching the request with the support of a search engine. This information can be sorted or organized (for example, by price, size, or other criteria) based on customer input. Through this type of display, all or a designated portion of the product and service information will preferably be displayed with a standard look and feel. The initial display preferably will only provide simple and basic information on the products and services to facilitate comparisons for the customer. If the customer wants to review a product or service in more detail, the customer preferably can "drill down" for more detailed information for each product or service. With reference to FIG. 8B, the web or network based application will preferably also include an administrative function for suppliers and service providers to update their product and service information whenever necessary. For example, suppliers and service providers may also access the database through the same or another web or network-based application, to monitor inventory, sales data, customer information, and/or other data of interest.

Through this application, customers can conduct direct transactions with suppliers and/or service providers, and the customer is able to search for and identify a desired product or service with increased convenience. This application can provide a new sales channel for suppliers and service providers, thereby increasing their sales volume. For customers, the ability to perform direct price comparison will enable increased price competition among suppliers and service providers, thereby facilitating the best price for customers.

Even if suppliers and customers are able to conduct direct transactions with the support of information systems, however, the delivery time and the delivery cost for consumer goods are typically key issues to customers. To reduce the delivery time, a supplier's product is preferably delivered to a location close to the customer and ready for the future customer's purchase order, and its delivery from the actual delivery starting point to the final delivery point is preferably performed in the fastest way possible. To reduce delivery costs, the delivery method of a product between its production point and its final delivery point is preferably performed in the most efficient way possible, and its final delivery point is preferably located as near as possible to the customer. By delivering via a warehouse that is geographically close to a customer, shorter delivery times are enabled. Localized warehouse inventory quantities are maintained based on estimated local demand, constantly updated based on real-time monitoring of sales through the computerized communications network, resulting in quicker reaction times for restocking, and more accurate and efficient inventory control.

In this manner, the services of each warehouse and service center (WSC) are preferably shared by a plurality of providers. For example, the functions of the WSC include: reduction of delivery time through readiness for customers' purchase orders, the WSC being the actual delivery starting point; reduction of warehouse and service costs through sharing the cost just for the products that share the warehouse and service space with other providers, and through the flexibility to increase the turnover ratio by developing the "just-in-time" process; and making the most efficient way of delivery from WSC to the distribution and transportation center (DTC) with products for delivery from multiple suppliers. The DTC, correspondingly, functions to provide the most efficient way of delivery from DTC to the final delivery points with products from multiple WSC. And because a more streamlined process is achieved from the actual delivery starting point to the final delivery point, the overall delivery speed can be increased.

Figure 9:
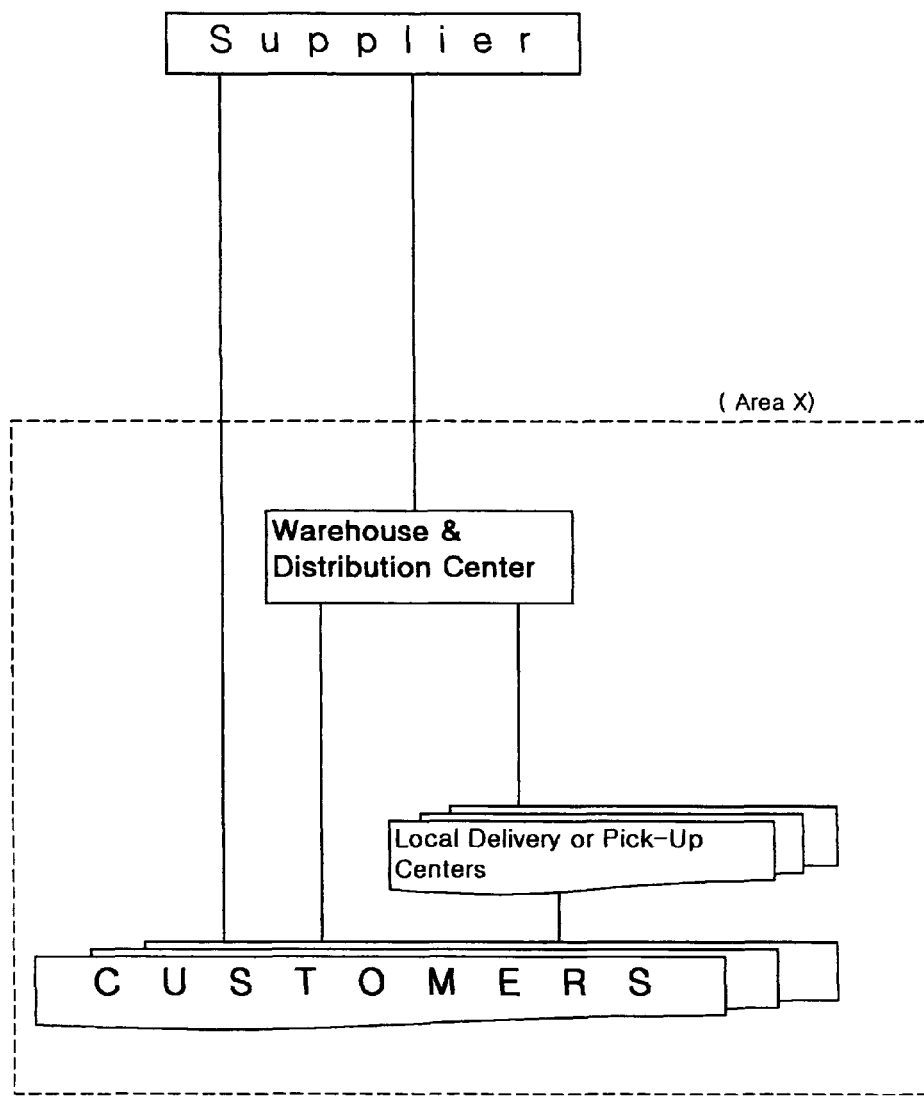
FIG. 9 shows a warehouse and distribution center and multiple local delivery or pick-up centers for distributing goods from a supplier to customers according to an example embodiment of the present invention.

FIG. 9 shows three delivery options from providers to customers in a certain area (Area X) according to an example embodiment of the invention. The first way is that a supplier directly delivers its individual product to the individual customer. The second way is that a supplier operates a warehouse & distribution center in that area and delivers its individual product from its warehouse & distribution center to the individual customer. The third way is that a supplier operates a warehouse & distribution center in that area and also operates many local delivery or pick-up centers, which are located in proximity and convenience to customers for more efficient deliveries. The question arises: Which delivery option is the best for a supplier and customers in a certain area (Area X)? The answer will depend on each option's delivery speed and unit delivery cost for a product. For one product, delivery speed may be more important than unit delivery cost and for another product, unit delivery cost may be more important than delivery speed. For some products, delivery speed or unit delivery cost is of no importance in their delivery. But for general products, faster delivery speed and more minimized unit delivery cost will be required. Another question arises: What about other areas, where there are no alternate delivery options available? The development of an information system for enabling direct transactions between suppliers and customers can be effective on the whole market simultaneously, but the development of an actual delivery system for consumer goods takes significant time, expense and effort. Therefore, suppliers and customers typically must select their delivery method from the delivery options available in their areas.

Since customers of a supplier typically are geographically scattered, and significant expense and effort are required to operate actual warehouses and distribution centers, it typically will be very difficult and expensive for each supplier to separately equip such systems independently. Thus it can be seen that a key opportunity for improvement in distribution methods and systems lies in suppliers' ability to obtain a faster delivery time and a minimized unit delivery cost.

Figure 10:
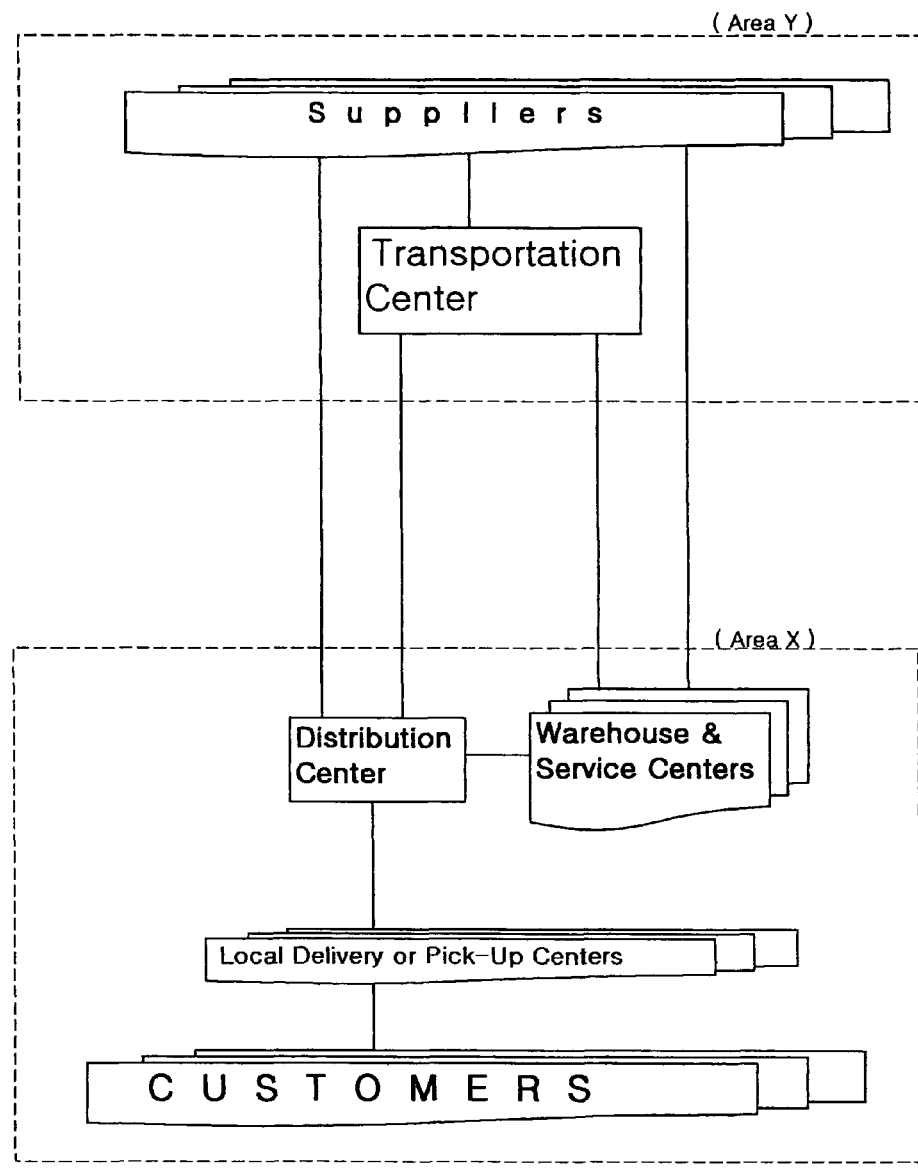
FIG. 10 shows a transportation center, a distribution center, multiple warehouse and service centers and multiple local delivery or pick-up centers for distributing goods from suppliers to customers, according to an example embodiment of the present invention.

Because many suppliers can present offerings through the above-described web or network based application, a reduction of delivery time and unit delivery cost can be realized using the system and method of the present invention, which preferably further comprises a transportation center, a distribution center, warehouse and service centers and local delivery or pick-up centers, as shown by way of an example embodiment in FIG. 10. These benefits are enabled through the centralization of transportation, distribution, warehousing and local delivery or pick-up functions, allowing costs to be spread across multiple suppliers. The deliveries between the transportation center and the distribution center, between the warehouse and service center and the distribution center and between the distribution center and the local delivery or pick-up center are preferably performed by the most efficient way available, and the cost will preferably be shared by joined affiliated suppliers by reasonable volume base, not priced by an individual product's size and weight like in other individual delivery systems. Also to reduce cost, the local delivery or pick-up center as the final delivery point should be located in proximity to customers. For example, existing convenience stores, drug stores, grocery stores, and/or other providers in a local area, or newly established outlets, can serve as the local delivery or pick-up center. Customers preferably can pick up their products at the local delivery or pick-up center without additional cost, or can receive them at home with reduced cost.

The main function of warehouse and service centers is to be ready for the delivery of customers' purchase orders from a certain area (Area X), in order to reduce delivery time. Therefore, the warehouse and service centers, as the actual delivery starting points, are preferably located close to customers in a certain area, and also located close to and linked to the distribution center to make a faster delivery to the local delivery or pick-up centers. In essence, the transport, distribution, warehousing and local delivery or pick-up of each supplier's offerings are outsourced. This structure allows for one entity to focus on the operation and cost reduction of transport, distribute, warehousing and local delivery or pick-up and decrease overall costs by servicing multiple suppliers.

Many labor elements may be required for the distribution center and the warehouse and service center, because they actually include shipping and handling for each product. Therefore, many incidental costs will be added when the optimal level of warehouse and service space is not kept. As seen in FIG. 10, the optimal level of warehouse and service space in Area X required for suppliers will be decided by
 (a) the transportation time between Area Y and Area X
 (b) the estimated volume of goods needed in Area X
Therefore, each supplier can minimize the unit product warehouse and service cost by developing the "just-in-time" process to increase the turnover ratio of the unit warehouse and service space.

As shown in FIGS. 11-A and 11-B, present service businesses may be classified by the type of interaction between service providers and consumers, and the exchange of information or provision of service. For example, the service provider in FIG. 11-A generally receives information from a customer and provides information to the customer, or just supplies an object, which obtains information, to the customer. On the other hand, service provider in FIG. 11-B receives information or a tangible object from a customer and delivers the goods or the object back to the customer after the actual service.

For a Type A-1 service provider, only information is transferred between customers and service providers. Examples include hotel and car rental reservations, e-ticketing and activation information. A Type A-2 service provider receives information from the customer and provides the customer a tangible form or document, such as a paper ticket or insurance policy. A Type A-3 service provider only supplies a tangible object (for example, a pre-paid calling card) to the customer. In this case, the tangible object provides the customer with a "credit" for a future service.

Figure 12:
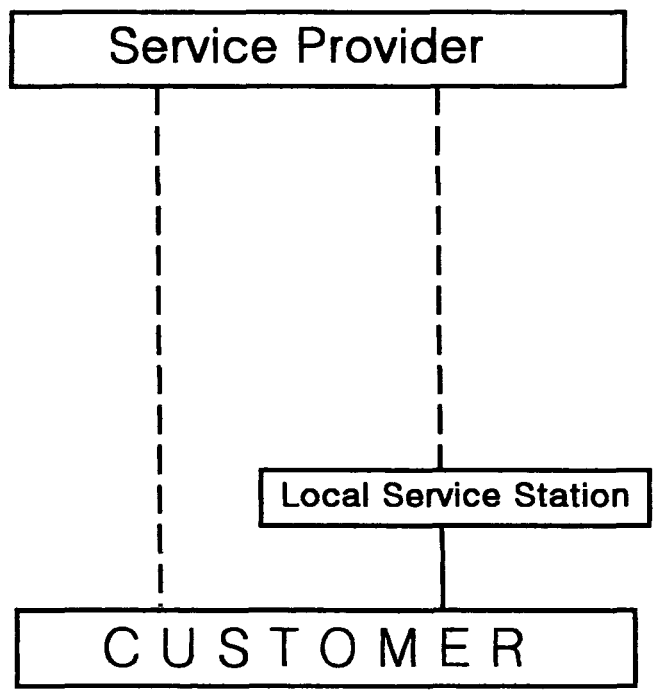
FIG. 12 shows a method for providing services to a customer of a service provider, including a local service station, according to an example embodiment of the present invention.

As shown in FIG. 12, local service stations are preferably established in proximity to customers, and supplied with certain basic equipment (e.g., computer terminal, printer, scanner, etc.) such as that typically needed to provide a product and/or a service to a customer. Efficiency can be increased in this manner, through 1) new distribution channels for the offering, 2) reduced delivery costs due to proximity to customer, and 3) more flexible payment methods (i.e. cash) for customers.

Type B-1 service providers preferably receive information or a tangible object (e.g., a prescription slip) from the customer, process the information and deliver goods to the customer. Type B-2 service providers follow a process where a tangible object is provided to the service provider, services are rendered to that object, and the object is delivered back to the customer. For these types of service providers, proximity to customers and delivery costs typically are key considerations for the success of their business. Examples include dry cleaning businesses, repair businesses and many franchise service businesses.

Figure 13:
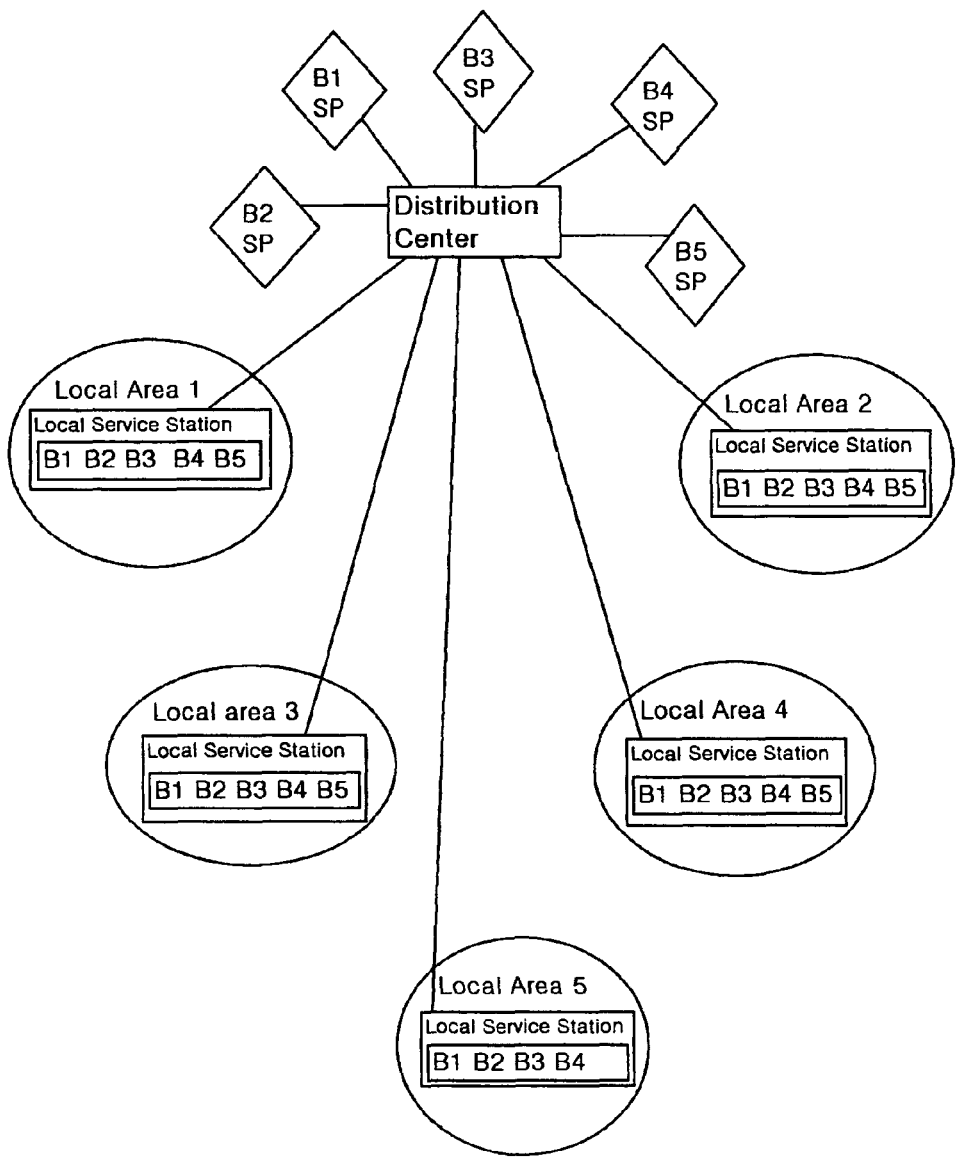
FIG. 13 shows a method for providing services to customers of service providers through a distribution center and a network of local service stations, according to an example embodiment of the present invention.

FIG. 13 shows an example system and method according to the present invention, for structuring Type B-1 and B-2 service providers with a common distribution center in order to perform a service and reduce operating costs. Features of this system and method include:
 Service providers, local service stations and the distribution center preferably each perform a designated function in the overall process to provide a service to the customer.
 Service providers are able to increase their business volume through many local service stations.
 The local service station is able to increase its business volume through handling multiple possible kinds of businesses including Type B-1 and Type B-2 businesses.
 The distribution center handles the delivery of products between local service stations and service providers using the most efficient delivery method available.

Figure 14:
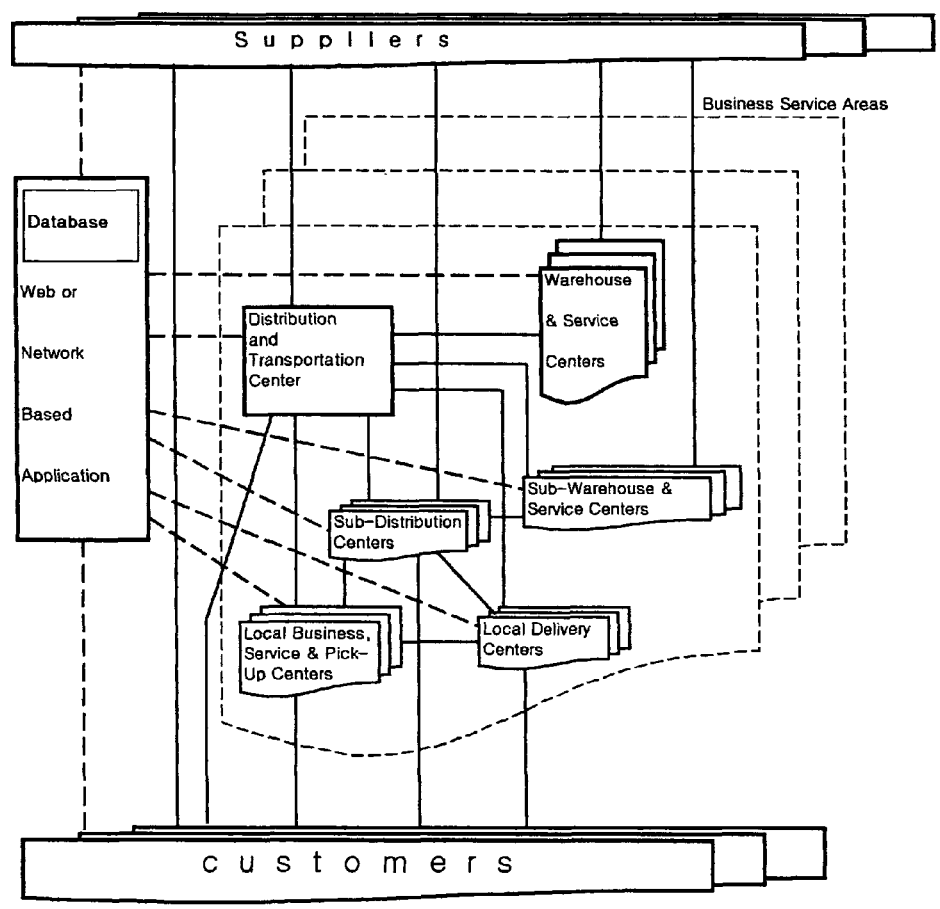
FIG. 14 shows a method for delivering goods to customers, according to an example embodiment of the present invention.

FIG. 14 depicts an example embodiment of a marketing and distribution system and method for consumer goods according to the present invention, which facilitates lower price and improved service to customers. Features of this system and method preferably include:

- All units of this system are preferably connected by a database application and web or network based application.
- The market is preferably divided into one or more business service areas, based on factors such as regional considerations, administrative districts, population density and/or convenience of transportation. The scale of division unit is preferably selected to maintain efficiency for the whole market.
- Each business service area preferably has one (1) distribution and transportation center (DTC).
- The network of warehouse and service centers (WSC) is preferably operated in proximity to the distribution and transportation center.
- The supplier preferably has the option of sending its completed goods directly to the DTC or to rent storage space at the WSC or sub-warehouse and service center (SWSC) pending order by the end customer.
- The required number of sub-distribution centers (SDC) is preferably managed and operated in strategic locations of each business service area (BSA).
- Also the limited network of sub-warehouse and service centers is preferably operated in proximity to the sub-distribution center.
- Local business, service and pick-up centers and local delivery centers are preferably operated in proximity to convenient locations to provide customers with fast and inexpensive delivery.

This system and method preferably utilize information technology to provide for direct transactions between the suppliers and end-customers by offering convenient access to the basic information on products and presenting that information in an integrated and standardized fashion. This direct approach can:

- Provide significant price reductions by fundamentally removing middlemen which currently exist between customers and suppliers.
- Reduce delivery time and cost through efficient use of the warehouse and service center and by locating the final delivery point close to customers.
- Minimize the unit product delivery cost through efficient use of the distribution and transportation center and the local delivery or pick-up center.
- Provide suppliers with the capability to manage all of the required information to support the ordering and distribution processes.

Figure 15:
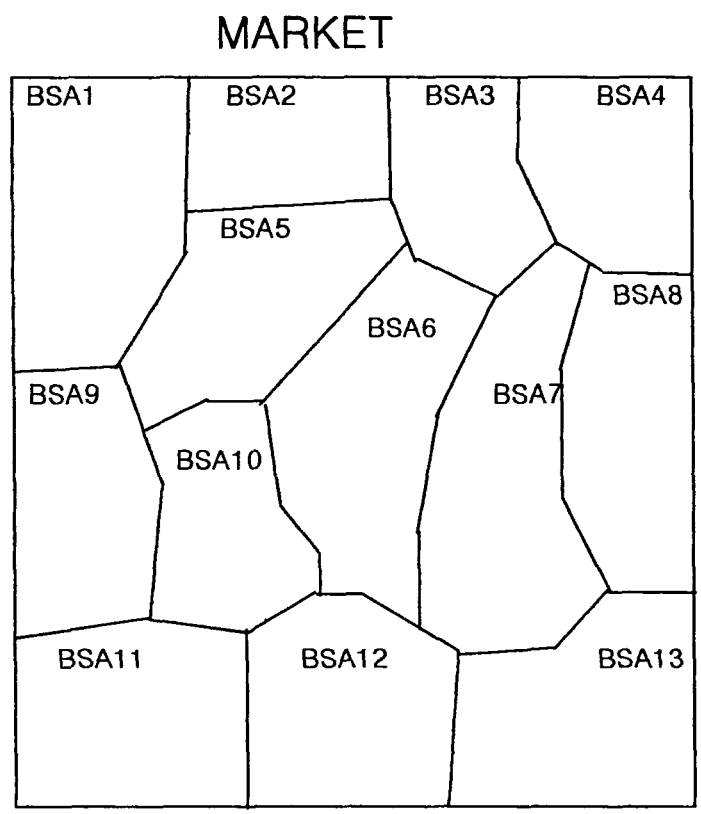
FIG. 15 shows the division of a market into multiple business service areas, according to an example embodiment of the present invention.

FIG. 15 shows the shape of a market, which is divided into a plurality of Business Service Areas. Each Business Service Area (BSA) is preferably considered and operated as an independent business unit.

The products and prices may be the same in each BSA, or may be different for each BSA due to the distance between each BSA and each supplier and/or due to regional differences. Therefore, it might be necessary that each BSA is operated as an independent business unit to support more flexibility rather than uniformity. The scale and size of each BSA can also be the same or different according to the convenience of location and the efficiency of the area. However, each BSA preferably provides the same products and level of service within its region. Each BSA preferably also has the option of customizing its web or network based application to meet the specific needs of that BSA.

Figure 16:
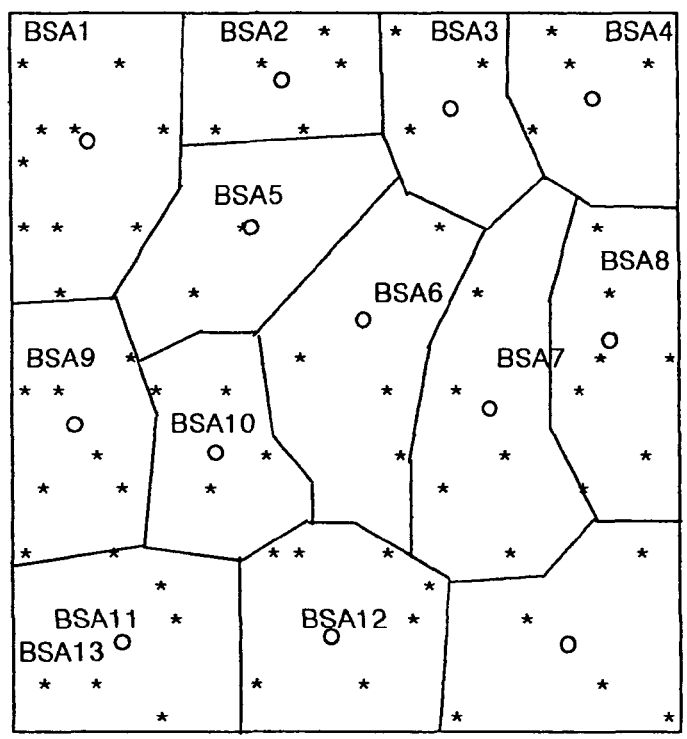
FIG. 16 shows the division of a market into multiple business service areas according to FIG. 15, showing suppliers and distribution and transportation centers.
Figure 17:
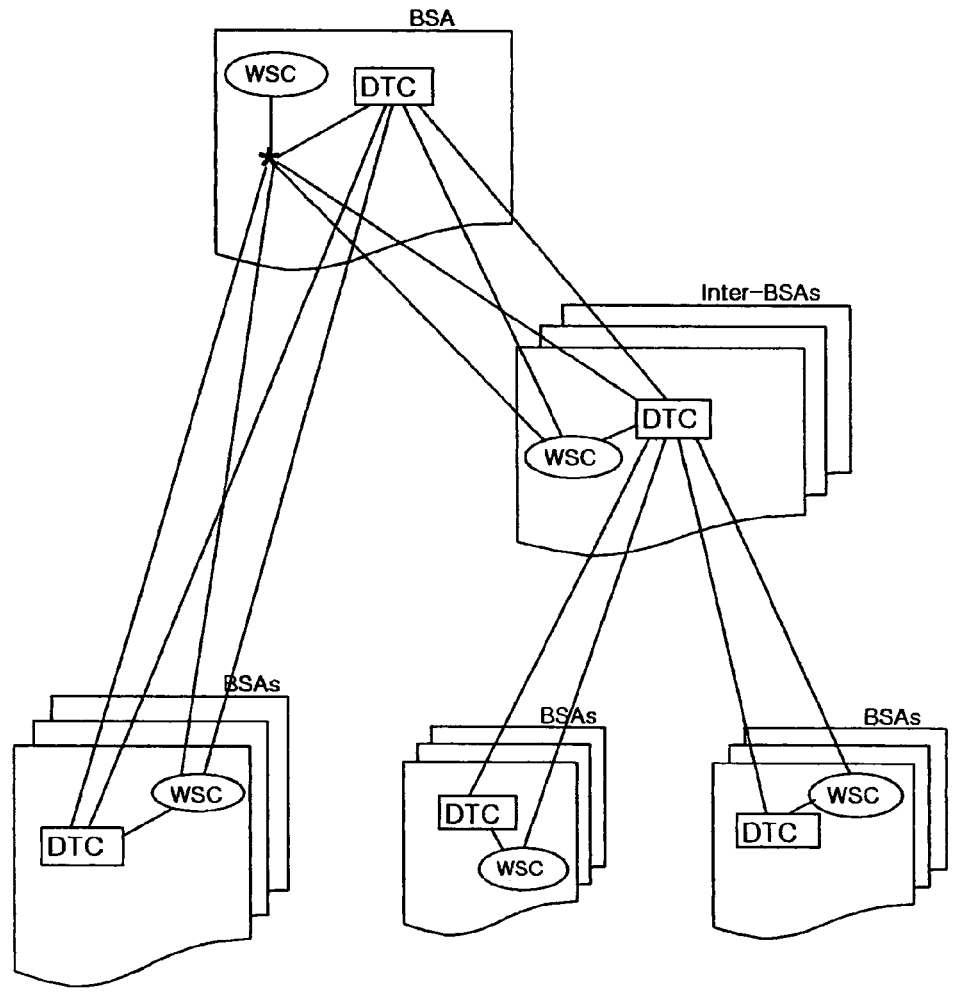
FIG. 17 shows the role of inter-business service area distribution and transportation centers for transporting goods from a supplier to distribution and transportation centers or warehouse and service centers in multiple business service areas, according to an example embodiment of the present invention.

As shown in FIG. 16, each Business Service Area preferably includes one distribution and transportation center (DTC). A primary objective of the DTC is to provide a smooth and efficient distribution system for the BSA. To achieve this objective, the DTC preferably manages all warehouse and service centers, sub-distribution centers, sub-warehouse and service centers, local business, service and pick-up centers, local delivery centers, etc. and preferably is the leader for marketing and system development. Another role of the DTC is preferably to construct and/or oversee the transportation system, which is preferably associated with DTCs in other BSAs. Therefore, depending on the situation, some DTCs may serve the role of Inter-BSA DTC as shown in FIG. 17. The DTC preferably also manages the relationships with the suppliers, including planning and execution of the system as shown in FIG. 10.

Figure 18:
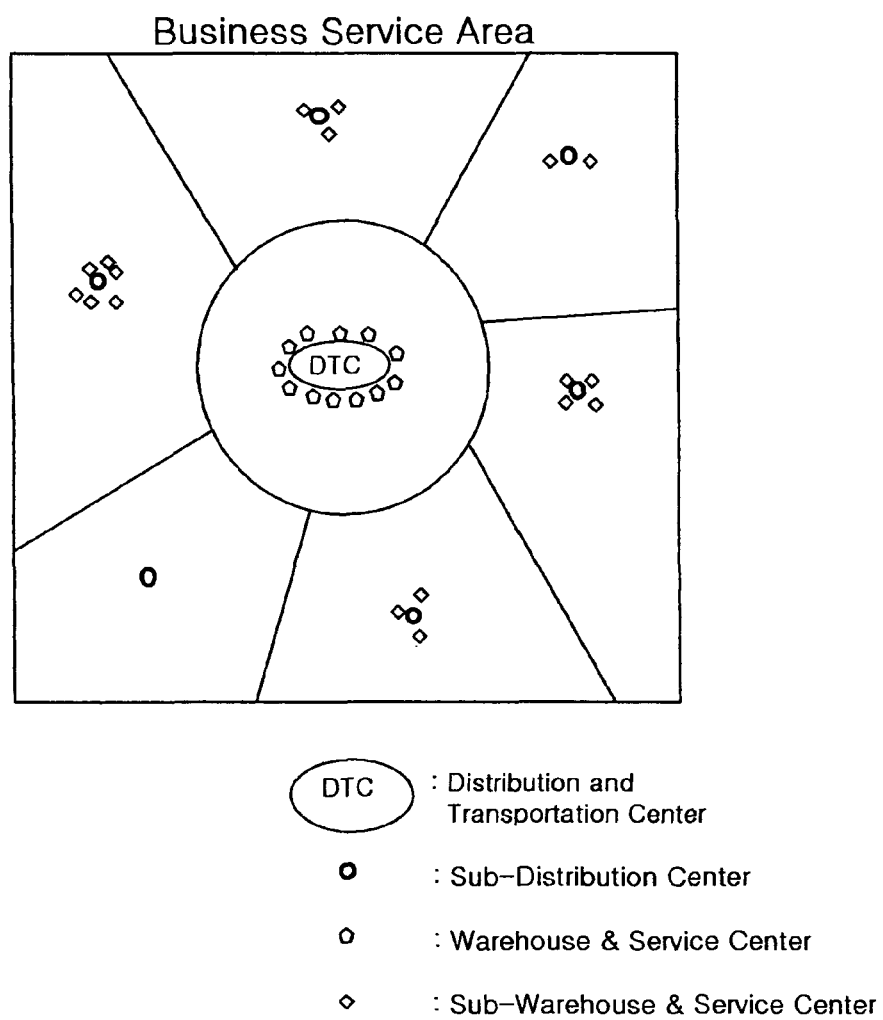
FIG. 18 shows various elements of a system and method for delivering goods to customers within a business service area, according to an example embodiment of the present invention.

As shown in FIG. 18, multiple warehouse and service centers (WSCs) are preferably located close to and linked to each distribution and transportation center. The WSCs preferably establish the standards for warehouse, shipping & handling for each supplier and product. By utilizing this system, suppliers can receive valuable assistance establishing marketing plans and market reclamation efforts. The WSC can also improve its own business by raising the quality of service for suppliers and increasing the productivity of its own operation. If suppliers themselves or suppliers' own distribution centers are situated in the same BSA, and they have the same networking system as the WSC, they can perform their own WSC role and integrate to the rest of the system.

If the estimated sales volume in a local area of a BSA is significant and the delivery expense between the DTC and SDC is greater than the expense of operating another warehouse and service center closer to the SDC, the system and method of the present invention preferably utilize a sub-warehouse and service center. The use of a sub-warehouse and service center will also add more locations with proximity to end-customers and therefore maintain the necessary delivery capability in the BSA.

Figure 19:
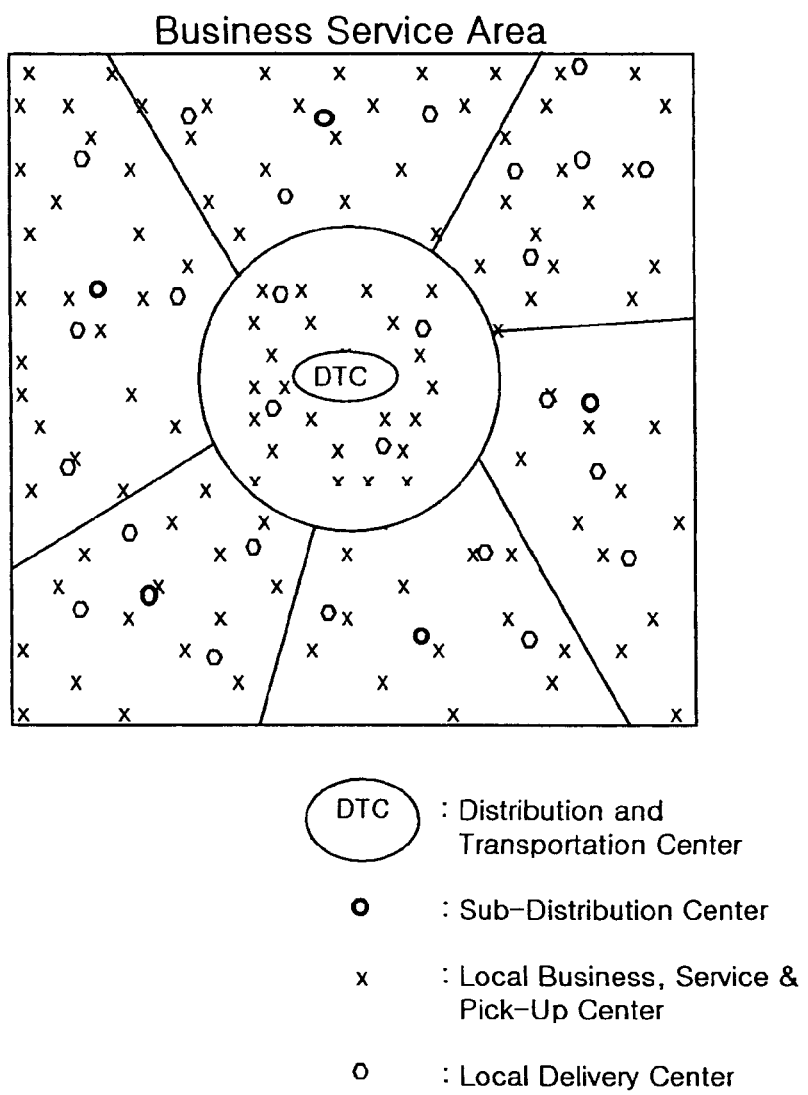
FIG. 19 shows additional elements of a system and method for delivering goods to customers within a business service area, according to an example embodiment of the present invention.

FIG. 19 shows the operation of sub-distribution centers (SDCs) located in strategic areas around the distribution and transportation center (DTC) and also the operations of many local business service and pick-up centers (LBSPCs) and Local Delivery Centers (LDCs). A benefit of this embodiment of the present invention is the minimization of the unit product delivery cost by keeping the optimal level of volume delivery in all delivery processes until customers finally receive the products they ordered. If customers pick up the ordered products in the LBSPC, the customer will reap the benefits of the reduced cost for delivery. If customers prefer direct delivery to their homes, this service can be provided through the LDC, and the actual price of the product will include the incremental cost for this direct delivery ("last mile delivery cost"). Since the purpose of the SDC is to cover more area with small investment, the SDC is preferably linked strategically and efficiently to DTC.

As shown in FIG. 14, general customers typically can increase satisfaction by receiving their ordered products through a local business, service and pick-up center. Many factors, such as the special characteristics of a product, and special considerations or requirements of some customers, render flexibility to support these factors without changing the basic operation and structure of the system and method of the present invention desirable. Therefore, the system and method of the present invention preferably offer the option of more than one final delivery method to the end customer, such as:

Local business, service and pick-up center: This method is preferably the basic (i.e., "default") delivery method. The price of a product delivered using this method preferably will be always the same in the same business service area.

Local delivery center: This method will deliver products to the customers' door (or other specified delivery location), if requested, and the price of the order preferably will include the additional "last mile delivery cost".

Direct delivery through the DTC or SDC: If a product is, for example, large, heavy or otherwise difficult to handle by LBSPC or LDC (e.g., a computer), the delivery is preferably made to the customer directly from the DTC or SDC. These centers preferably will have the proper equipment and labor to handle these types of special products.

Figure 20:
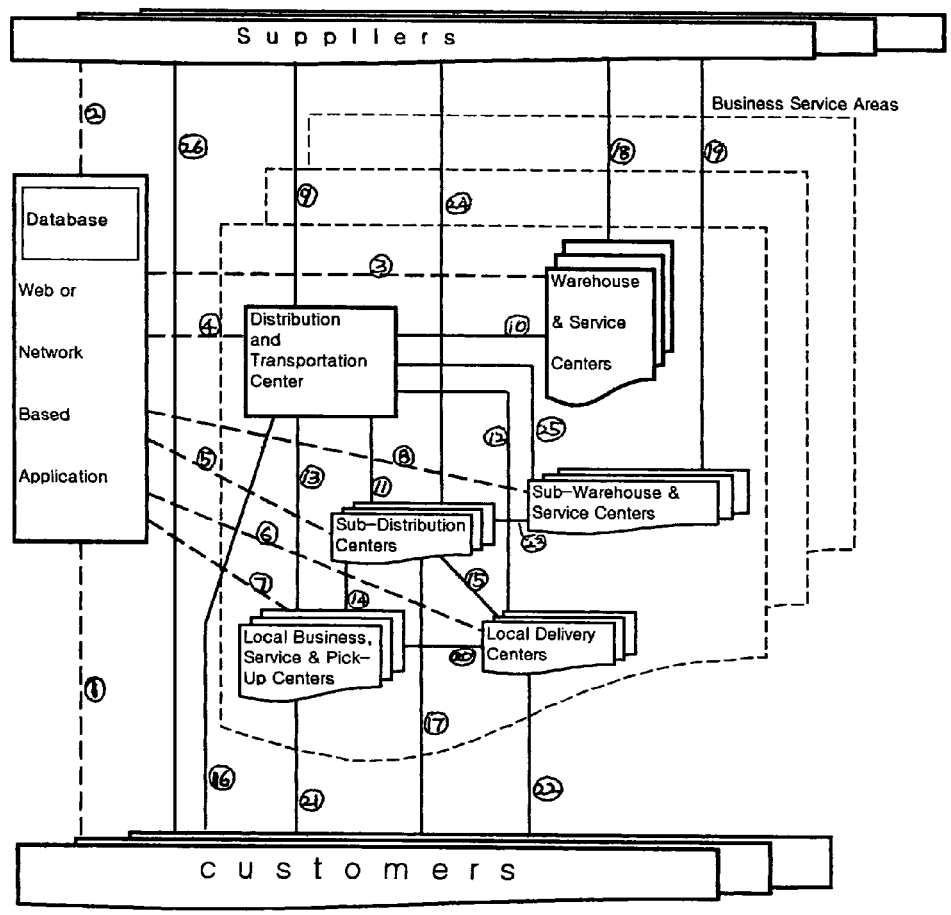
FIG. 20 shows channels of distribution for delivering goods to customers, according to an example embodiment of the present invention.

FIG. 20 presents an overview of the distribution chain and operation of an example embodiment of a system and method according to the present invention:

1. Customers access the web or network based application and select a specific business service area (Ref. No. 1).
2. The basic information for all products available for transaction in this business service area is presented to the customer (Ref. No. 2).
3. In this website, the basic product information is integrated according to the kind and characteristic of each product, and composed to easily compare and analyze among competing products for customer's easy judgment and decision.
4. If customers want more detailed information on a product, they can preferably access more specific information through the web or network based application (Ref. No. 2).
5. The purpose of this process is to increase customer's convenience and to provide specific product and marketing information directly from the relevant suppliers.
6. Customer chooses the local business service and pick-up center located most conveniently to the customer or designates another option, if desired, for products available for the delivery system (i.e. DTC, WSC, SDC, etc.) in this business service area. For products not available for the delivery system in this business service area, customer can choose other available options for the delivery.
7. Customer places order using the web or network based application.
8. Order is communicated to the relevant supplier (Ref. No. 2) and/or to the WSC (Ref. No. 3), DTC (Ref. No. 4), SWSC (Ref. No. 8), SDC (Ref. No. 5), LDC (Ref. No. 6) and/or LBSPC (Ref. No. 7), as appropriate.
9. When the supplier or distribution element (i.e. WSC, DTC, SWSC, SDC, LDC, LBSPC) receives the order, it will prepare and ship the purchased goods to the customer directly (Ref. No. 26), to the DTC (Ref. No. 9), to the WSC (Ref. No 18), to the SWSC (Ref. No 19), to the SDC (Ref. No. 24), or fulfill the order from its inventory at the WSC (Ref. No. 10) or SWSC (Ref. No. 23).
10. The goods will then be distributed to the end customer using the chosen customer delivery or pick up option. These distribution paths preferably include:
    From the producer to the customer (Ref. No. 26)
    From the WSC to the DTC (Ref. No. 10);
    From the DTC to the:
        SDC (Ref. No. 11);
        LDC (Ref. No. 12);
        LBSPC (Ref. No. 13); or
        Directly to the end customer (Ref. No. 16).
    From the SWSC to the SDC (Ref. No. 23);
    From the SDC to the:
        LDC (Ref. No. 15);
        LBSPC (Ref. No. 14); or
        To the end customer (Direct) (Ref. No. 17).
11. The goods sent through the LBSPC (Ref. No. 13 or 14) will be held temporarily for customer's pick-up.
12. The goods sent through the LDC (Ref. No. 12 or 15) will be delivered directly to the customer.
13. The suppliers are preferably notified of distribution hand-offs and deliveries in real time during the whole delivery process, as for example through email notification or made available online through a web or network based application.
14. The suppliers preferably can check their demand and inventory status through the web site (Ref. No. 2), and have access to improved demand and purchase data. This information can be used for improved forecasting and planning.
15. Customers can confirm the delivery status of their order through the web or network based application and also be notified automatically via e-mail when the order has reached the final delivery point (e.g. LBSPC, LDC or customer address).

To summarize, advantages and benefits of example embodiments of the distribution system and method of the present invention include:

Significant price reduction for end customers by removing middlemen between suppliers and customers.

Improved access to end customer information for supplier product development and service improvement.

Improved direct marketing opportunities for suppliers.

Reduced delivery cost through management of distribution and delivery as a separate "link" in the distribution chain.

Reduced timeline for customer delivery.

Improved customer convenience for customer delivery and pick-up.

One-stop e-shopping for customers.

Provides end customer with improved opportunity for price comparison.

The system will facilitate secure transactions for both suppliers and end customers. Suppliers will benefit by payment for goods at the time of ordering (prior to shipping). Alternatively, customers can be given the option of payment upon delivery or pick-up, allowing direct payment by cash or check or the like. End customers will benefit from performing their transaction directly with the supplier and also having the ability to confirm and check the status of their delivery at all points in the distribution process.

Improved customer satisfaction through more efficient shopping, ordering and delivery process.

Improved efficiency of overall distribution chain.

Increased sales and customer convenience through use of LBSPC, more flexible payment methods and opportunity to provide additional services to the customer.

Of course, it will be understood that particular embodiments of the invention may or may not present every one of these advantages and benefits, depending on the particular application at hand.

Figure 21:
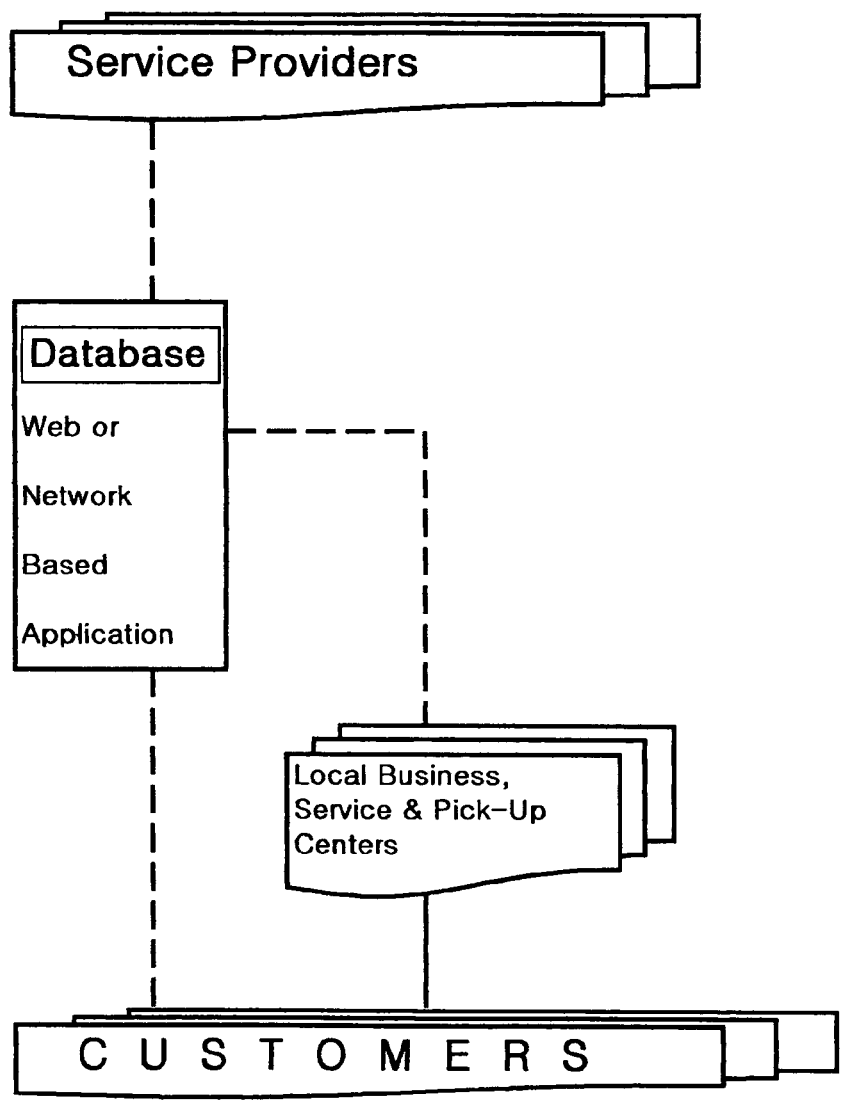
FIG. 21 shows a system and method for providing services to customers through a web or network based application and database application, and a local business service and pick-up center, according to an example embodiment of the present invention.

Businesses of Type A, shown in FIG. 12, typically do not have regional limitations because primarily information only is passed between the customer and the service provider. FIG. 21 shows an example embodiment of a market and distribution system and method according to the present invention, that is suitable for Type A service providers. A Type A-1 service provider preferably utilizes the system shown in FIG. 21 according to the following process:

Customers connect to the web or network based application, search for the desired service products and perform price comparison across multiple service providers.

Customers choose whether they want on-line payment (or security deposit) or pay at a LBSPC.

If customers choose on-line payment (or security deposit), they will provide the related information (Credit Card Number, etc.) to service provider and complete the transaction.

If customers want to pay through LBSPC with different payment method, they will receive confirmation information and choose the location for payment and delivery of the service.

Customers can pay for the service with the desired method at the selected LBSPC.

Advantages of this system for Type A-1 service providers include the ability for customers to easily perform price comparison, and that multiple payment methods are available to the customer.

A Type A-2 Service Provider (the basic characteristic of paper tickets or insurance policy documents, for example, being that they are generally certified forms) can utilize the system and method shown in FIG. 21 according to the following process:

All LBSPCs are equipped with the equipment and capability to provide the certified form.

Customers connect to the web or network based application, search for the desired service products, and perform price comparison across multiple service providers.

Customers can choose various methods of payment and select location for pick up.

Customers can pick up and pay for the service at the selected LBPSC.

Advantages of this system for Type A-2 service providers include faster delivery time of a certified form to customer, the ability of the customer to select a convenient location to pick up the form, and the availability of multiple payment methods for the customer.

Type A-3 businesses also can benefit from the system and method of the present invention, as shown by way of example in FIG. 21, through more flexible delivery options of products such as a pre-paid phone card or the like, and the activation information required to use them. A Type A-3 service provider preferably utilizes the system according to the following process:

Customers connect to the web or network based application, search for the desired service products and perform price comparison across multiple service providers.

Customers choose whether they want the product and activation information provided to them directly or through a LBSPC.

Customers can pick up the phone card and the activation information at the selected LBSPC.

Advantages for Type A-3 service providers include increased customer convenience through use of the integrated website, a centralized site for selection of services; increased customer convenience through flexible pick up at the LBPSC; price reduction for customers and cost reduction for service providers through elimination of middlemen; and ease of price comparison for customers.

Figure 22:
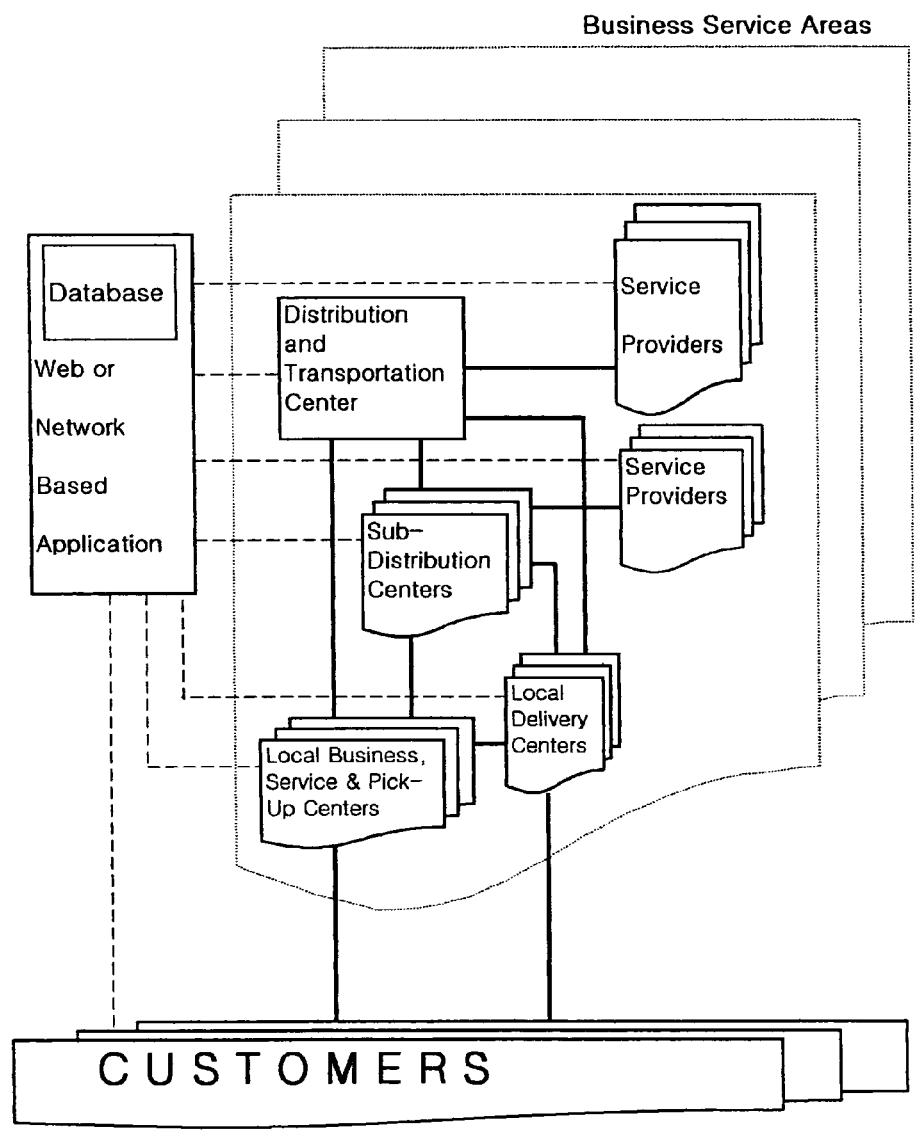
FIG. 22 shows an example system and method for delivering goods and providing services to customers across multiple business service areas, according to an example embodiment of the present invention.

FIG. 22, FIG. 23-A, FIG. 23-B and FIG. 23-C show a marketing and distribution system and method for Type B businesses according to an example embodiment of the invention. The system and method preferably include the following features:

The web or network based application and database application connects all units of this system for a service provider.

Service providers segment their business area by BSA and/or sub-distribution area (SDA), by multiple sub-distribution areas or by multiple business service areas.

Service providers locate their business service centers in proximity to distribution and transportation center (DTC) or sub-distribution center.

LBSPCs are enabled with the equipment required to perform the service.

Local delivery centers are utilized to provide the end product to customers. The depicted operations of FIG. 22 are:

Customers can review service providers available in their area through the web or network based application, perform price comparison and select the service provider.

Customers can drop off their item requiring services in a conveniently located LBSPC.

Customers can pick up the item after services are rendered at the same LBSPC, a different LBSPC, or through direct delivery.

If price and amount of time needed to perform the service are not pre-determined, customers can receive an estimate for the service through e-mail or at an LBSPC and accept or reject. If the service is not accepted, customer's goods will be immediately delivered back to the designated LBSPC, and customers can pick up the returned item.

FIG. 23-A shows an example embodiment of the operation of business areas for each service provider as follows:

Service providers who segment their business area by business service area locate their business centers in proximity to a distribution and transportation center (DTC).

Service providers who segment their business area by sub-distribution area locate their business centers in proximity to a sub-distribution center (SDC).

Local business service and pick-up centers (LBSPC) can handle service businesses, which are segmented to its business service area and only to its sub-distribution area.

FIG. 23-B and FIG. 23-C show the operation of service businesses, which are segmented by multiple sub-distribution areas as follows:

Some service providers can increase their business volume by enlarging their business area to their neighboring sub-distribution areas without establishing another business centers in those areas.

FIG. 23-C shows the operation of service businesses, which are segmented by multiple business service areas as follows:

Some service providers have a capability (technologically or operationally) to handle their service businesses in multiple business service areas with one business center in a business service area.

For fast and efficient delivery, objects requiring transportation between business service areas will be handled through the most efficient method between distribution and transportation centers.

Advantages of example forms of this system for Type B service providers include:

Increased business volume.

Reduced operating expenses through centralization of location where services are performed.

Ability to purchase parts and raw materials in volume and at a reduced price.

Improved customer convenience through multiple options to pick up and drop off their items.

Service providers can focus on providing specialty or customized services for each customer.

While the invention described with reference to preferred and example embodiments, it will be understood by those skilled in the art that a variety of modifications, additions and deletions are within the scope of the invention, as defined by the following claims.

What is claimed is:

1. A method for delivery of goods in a first plurality of defined local areas, the method including the steps of:

i. providing a computer having a software application running an internet based application;

ii. dividing a large area containing a second plurality of potential customers into the first plurality of defined local areas and keeping track of the defined local areas in the software application;

iii. providing an internet web site using the software application used by (a) a third plurality of suppliers of goods and services inside and outside of the defined local areas, (b) a fourth plurality of warehouses proximate each of the first plurality of defined local areas receiving and storing the goods of the third plurality of suppliers, (c) a fifth plurality of at least one of pickup centers, delivery centers, and distribution and transportation centers transporting the goods, at least one of the pickup centers, delivery centers, and distribution and transportation centers being located inside each of the first plurality of defined local areas, and (d) the second plurality of potential customers seeking to purchase the goods of the third plurality of suppliers, wherein the potential customers are located throughout the first plurality of defined local areas;

iv. offering goods via the website using the software application, wherein the goods are offered via the website using the software application by the third plurality of suppliers and to the second plurality of potential customers, the offering resulting in direct transactions between the third plurality of suppliers and the second plurality of customers by bypassing wholesalers and distributors;

v. using the software application, enabling the distribution and transportation centers to transport the goods and enabling the fourth plurality of warehouses to receive and store the goods of the third plurality of suppliers prior to consummation of any purchases of the goods;

vi. displaying, by the website and on computers of the second potential customers, the goods offered by the third plurality of suppliers, wherein like goods of different suppliers are offered for the same price, wherein the price includes any shared delivery charges to a predetermined point within a selected one of the first plurality of defined local areas, and wherein the price constitutes prices offered to the potential customers as already delivered to and as being shipped from the predetermined point;

vii. requiring a selected supplier of the third plurality of suppliers to provide goods to at least one of a selected warehouse of the fourth plurality of warehouses and a selected one of the at least one pickup centers and delivery centers for a selected one of the first plurality of local areas prior to any purchase of the goods by an actual customer in the selected one of the first plurality of defined local areas, where the selected supplier has provided goods to at least one of the selected warehouse and the selected one of the pickup centers and delivery centers, and wherein the goods have at least a predetermined volume;

viii. directly integrating the suppliers' distribution of their offerings;

ix. wherein the same offerings of goods and level of service are provided within the same defined local area;

x. wherein each of the defined local areas includes at least one of the pickup centers, delivery centers, and distribution and transportation centers;

xi. wherein the price, including any delivery cost, of like goods delivered through the at least one local pickup center, delivery center, and distribution and transportation center as a final delivery method is always the same in the same defined local area for each of the third plurality of suppliers, the delivery cost being shared by the third plurality of suppliers based on volume and not on package weight, and xii. in response to a particular customer of the second plurality of potential customers selecting a selected good, and seeking to purchase the selected good from a particular supplier offering the selected good in a local area of the particular customer and having the selected good already in the warehouse in the defined local area prior to the purchase, wherein the particular customer is using the web site, wherein the particular customer compares the offerings of the selected good of different suppliers delivered to a selected delivery initiation point which constitutes the predetermined point of the at least one local pickup center, delivery center, and distribution and transportation center in the same defined local area, the offerings of like goods from different suppliers having the same price that includes any shared delivery charges to the selected delivery initiation point in the defined local area, regardless of a location of the particular supplier with respect to the defined local area, wherein the predetermined volume is greater than individual quantities, and xiii. wherein the fourth plurality of warehouses store the goods of each of the third plurality of suppliers separately from the goods of any other suppliers.

2. The method of claim 1, wherein there is a step of determining the predetermined volume based on transportation time between the suppliers' locations and the defined local area, and when an estimated volume of goods is going to be needed in the defined local area.

3. The method of claim 1, wherein in the step of providing the fifth plurality of pickup centers, delivery centers and distribution and transportation centers, there is a step of providing at least one delivery center in each of the first plurality of defined local areas.

4. The method of claim 1, wherein in the step of providing the fifth plurality of pickup centers, delivery centers and distribution and transportation centers, there is a step of providing at least one distribution and transportation center in each of the first plurality of defined local areas.

5. The method of claim 1, wherein in the step of providing the fifth plurality of pickup centers, delivery centers and distribution and transportation centers, there is a step of providing at least one of each of the pickup centers, delivery centers, and distribution and transportation centers in each of the first plurality of defined local areas.

6. The method of claim 1, wherein there is a step of providing a customer selected delivery method for a customer in the defined local area, and the customer selected delivery method costs the same for all potential customers located within the defined local area.

7. The method of claim 1, wherein each of the third plurality of suppliers shares warehouse costs with the third plurality of suppliers through payment just for products of each of the third plurality of suppliers that are stored in the fourth plurality of warehouses.

* * * * *